United States Patent
Balasubrahmanian et al.

(10) Patent No.: US 11,755,580 B2
(45) Date of Patent: Sep. 12, 2023

(54) METHOD AND SYSTEM FOR DEFINING AN OBJECT-AGNOSTIC OFFLINABLE SYNCHRONIZATION MODEL

(71) Applicant: Oracle International Corporation, Redwood Shores, CA (US)

(72) Inventors: Kaarthik Balasubrahmanian, Belmont, CA (US); Donald Creig Humes, Yorktown, VA (US); Hamid Bahadori, Atherton, CA (US); Sridhar Tadepalli, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/582,519

(22) Filed: Jan. 24, 2022

(65) Prior Publication Data

US 2022/0147586 A1     May 12, 2022

Related U.S. Application Data

(62) Division of application No. 16/877,689, filed on May 19, 2020, now Pat. No. 11,294,904, which is a
(Continued)

(51) Int. Cl.
| | |
|---|---|
| *G06F 9/46* | (2006.01) |
| *G06F 16/2455* | (2019.01) |
| *G06F 16/951* | (2019.01) |
| *G06F 16/2453* | (2019.01) |
| *G06F 16/33* | (2019.01) |

(Continued)

(52) U.S. Cl.
CPC ........ *G06F 16/24552* (2019.01); *G06F 9/466* (2013.01); *G06F 16/2365* (2019.01); *G06F 16/2379* (2019.01); *G06F 16/2386* (2019.01); *G06F 16/2453* (2019.01); *G06F 16/252* (2019.01); *G06F 16/3349* (2019.01); *G06F 16/951* (2019.01); *G06F 16/955* (2019.01);
(Continued)

(58) Field of Classification Search
CPC .. G06F 9/466; G06F 16/2365; G06F 11/3452; G06F 2201/87
USPC ........................................................ 707/610
See application file for complete search history.

(56) References Cited

U.S. PATENT DOCUMENTS

| | | |
|---|---|---|
| 5,809,509 A | 9/1998 | Blackman et al. |
| 6,804,627 B1 * | 10/2004 | Marokhovsky ..... G06F 11/3452 702/182 |

(Continued)

*Primary Examiner* — Hung T Vy
(74) *Attorney, Agent, or Firm* — Invoke

(57) ABSTRACT

Some embodiments optimize a local, pending transaction queue of transactions locally executed by a client application to be synchronized with a server. Multiple transactions, which may be executed by the client application for a same local object, need to be synchronized with a server. The transactions, in queue for synchronization with the server, may include transactions to add, delete, or modify objects. Each set of transactions for a particular object in queue for synchronization with the server corresponds to a particular net effect on the server if synchronized individually to the server. The client application may replace the set of transactions for the particular object with a reduced set of transactions corresponding to the net effect, or entirely removed without replacement if there is no net effect of the set of transactions on the server.

21 Claims, 13 Drawing Sheets

Related U.S. Application Data division of application No. 15/951,041, filed on Apr. 11, 2018, now Pat. No. 10,691,694.

(60) Provisional application No. 62/519,076, filed on Jun. 13, 2017, provisional application No. 62/519,068, filed on Jun. 13, 2017, provisional application No. 62/519,072, filed on Jun. 13, 2017.

(51) Int. Cl.
    *G06F 16/957*     (2019.01)
    *G06F 16/23*     (2019.01)
    *G06F 16/955*     (2019.01)
    *G06F 16/25*     (2019.01)
    *H04L 67/5683*     (2022.01)

(52) U.S. Cl.
    CPC ...... *G06F 16/9574* (2019.01); *H04L 67/5683* (2022.05)

(56) References Cited

U.S. PATENT DOCUMENTS

| | | | |
|---|---|---|---|
| 7,844,601 B2 | 11/2010 | Seeds | |
| 8,159,961 B1* | 4/2012 | Rai | H04L 67/01 370/252 |
| 8,682,925 B1 | 3/2014 | Marquardt et al. | |
| 8,706,717 B2 | 4/2014 | Rajasekhar | |
| 9,547,693 B1 | 1/2017 | Sheasby et al. | |
| 2006/0225000 A1 | 10/2006 | Albrecht et al. | |
| 2007/0016614 A1 | 1/2007 | Novy | |
| 2007/0100967 A1 | 5/2007 | Smith et al. | |
| 2008/0005685 A1 | 1/2008 | Drews et al. | |
| 2008/0243799 A1 | 10/2008 | Rozich et al. | |
| 2009/0276412 A1 | 11/2009 | Anderson et al. | |
| 2015/0112985 A1* | 4/2015 | Roggero | H04L 67/565 726/5 |
| 2015/0309874 A1* | 10/2015 | Liang | G06F 11/1076 714/766 |
| 2015/0331751 A1 | 11/2015 | Saeki | |
| 2015/0347508 A1 | 12/2015 | Lang et al. | |
| 2016/0098409 A1 | 4/2016 | Burke et al. | |
| 2016/0224641 A1 | 8/2016 | Elias et al. | |
| 2016/0335117 A1* | 11/2016 | Kogan | G06F 9/467 |
| 2017/0124146 A1* | 5/2017 | Lereya | G06F 16/2428 |
| 2017/0277396 A1 | 9/2017 | Chung et al. | |
| 2017/0357237 A1 | 12/2017 | Kim | |
| 2018/0059985 A1 | 3/2018 | Raghunath et al. | |
| 2018/0067620 A1 | 3/2018 | Adler et al. | |
| 2018/0089306 A1 | 3/2018 | Pal et al. | |
| 2018/0357237 A1* | 12/2018 | Balasubrahmanian | G06F 16/2386 |
| 2018/0357304 A1 | 12/2018 | Balasubrahmanian et al. | |

\* cited by examiner

METHOD AND SYSTEM FOR DEFINING AN OBJECT-AGNOSTIC OFFLINABLE SYNCHRONIZATION MODEL

INCORPORATION BY REFERENCE; DISCLAIMER

Each of the following applications are hereby incorporated by reference: application Ser. No. 16/877,689 filed on May 19, 2020; application Ser. No. 15/951,041 filed on Apr. 11, 2018; application No. 62/519,068 filed on Jun. 13, 2017; application No. 62/519,076 filed on Jun. 13, 2017; application No. 62/519,072 filed on Jun. 13, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to synchronizing objects. In particular, the present disclosure relates to synchronizing objects modified, created, or deleted by a client application with a remote datastore maintained by a server.

BACKGROUND

A client device may receive updates from or submit updates to a backend server. The updates, received or submitted by a client device, include updates to data.

Client devices may be operated in an online mode and an offline mode. An online mode is a mode in which a client device may communicate with a backend server via a network. An offline mode is a mode in which the client device is unable to communicate with a backend server via a network. When operating in an online mode, a client device may receive updates from and submit updates to a backend sever. When operating in an offline mode, a client device is unable to receive updates from or submit updates to a backend server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Some embodiments optimize a local, pending transaction queue of transactions locally executed by a client application to be synchronized with a server. Multiple transactions, which may be executed by the client application for a same local object, need to be synchronized with a server. The transactions, in queue for synchronization with the server, may include transactions to add, delete, or modify objects. Each set of transactions for a particular object in queue for synchronization with the server corresponds to a particular net effect on the server if synchronized individually to the server. The client application may replace the set of transactions for the particular object with a reduced set of transactions corresponding to the net effect, or entirely removed without replacement if there is no net effect of the set of transactions on the server.

This Specification may include, and the claims may recite, some embodiments beyond those that are described in this General Overview section.

2. Architectural Overview

Figure 1:
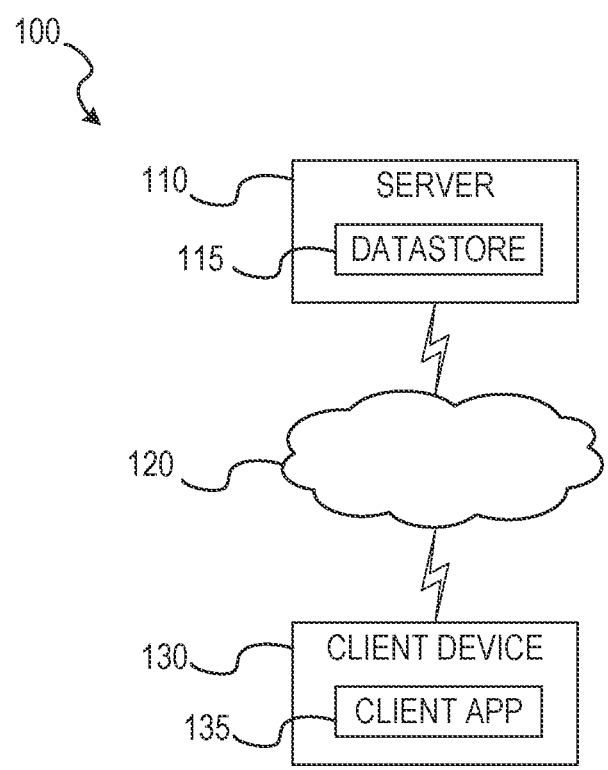
FIG. 1 shows a block diagram that illustrates a client-server computing system that operates over a network in accordance with one or more embodiments.

FIG. 1 shows a block diagram that illustrates a client-server computing system 100 that operates over a network 120 in accordance with one or more embodiments. The client-server computing system 100 may include a server 110 and a client device 130 communicatively coupled via the network 120. Each of the server 110 and the client device 130 may include a computing processor and associated memory and communications circuitry.

The network 120 may include a local area network (LAN), wide area network (WAN), Ethernet network, Token Ring network, asynchronous transfer mode (ATM) network, Wi-Fi network, the Internet, cellular telephone network, Enhanced Data rates for GSM Evolution (EDGE) network, long-term evolution (LTE) network, Worldwide Interoperability for Microwave Access (WiMAX) network, or other computing communications networks. The server 110 may include a datastore 115 that stores data accessible by the client device 130 via the network 120. The client device 130 may include a client application 135 (e.g., software application) that receives data from or accesses data stored in the datastore 115.

In an embodiment, the client device 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and a client device.

In one or more embodiments, the datastore 115 is any type of storage unit and/or device (e.g., a file system, database, collection of tables, or any other storage mechanism) for storing data. Further, the datastore 115 may include multiple different storage units and/or devices. The multiple different storage units and/or devices may or may not be of the same type or located at the same physical site. Alternatively or additionally, the datastore 115 may be implemented or executed on a computing system separate from the server 110. The datastore 115 may be communicatively coupled to the server 110 or the client device 130 via a direct connection or via the network 120.

The client application 135 may access data objects stored in the datastore 115 using a set of hypertext transfer protocol (HTTP) uniform resource identifiers (URIs), e.g., uniform resource locators (URL) used in conjunction with an HTTP request. HTTP may be used as a request-response protocol between the client device 130 and the server 110 to facilitate the transfer and management of data between the client application 135 and the datastore 115.

The server 110 may provide a representational state transfer (REST) service for servicing REST requests received from the client application 135. A REST request is a type of stateless HTTP request and may be transmitted to the server 110 by the client device 130. REST requests are subsets of HTTP requests. The REST request may use a set of uniform and predefined stateless operations. State may not be kept from request to request when the REST request is used. The server 110 may provide a description of the server 110 to the client application 135 as a REST server through a well-defined URL. Through this well-defined URL, the server 110 may provide a mechanism for the client application 135 to efficiently retrieve data from and upload data to the datastore 115.

In one or more embodiments, a user interface refers to hardware and/or software configured to facilitate communications between a user and the client device 130. The user interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface is specified in one or more other languages, such as Java, C, or C++.

In one or more embodiments, the client-server computing system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. An Adaptive Polymorphic Data Model

Figure 2:
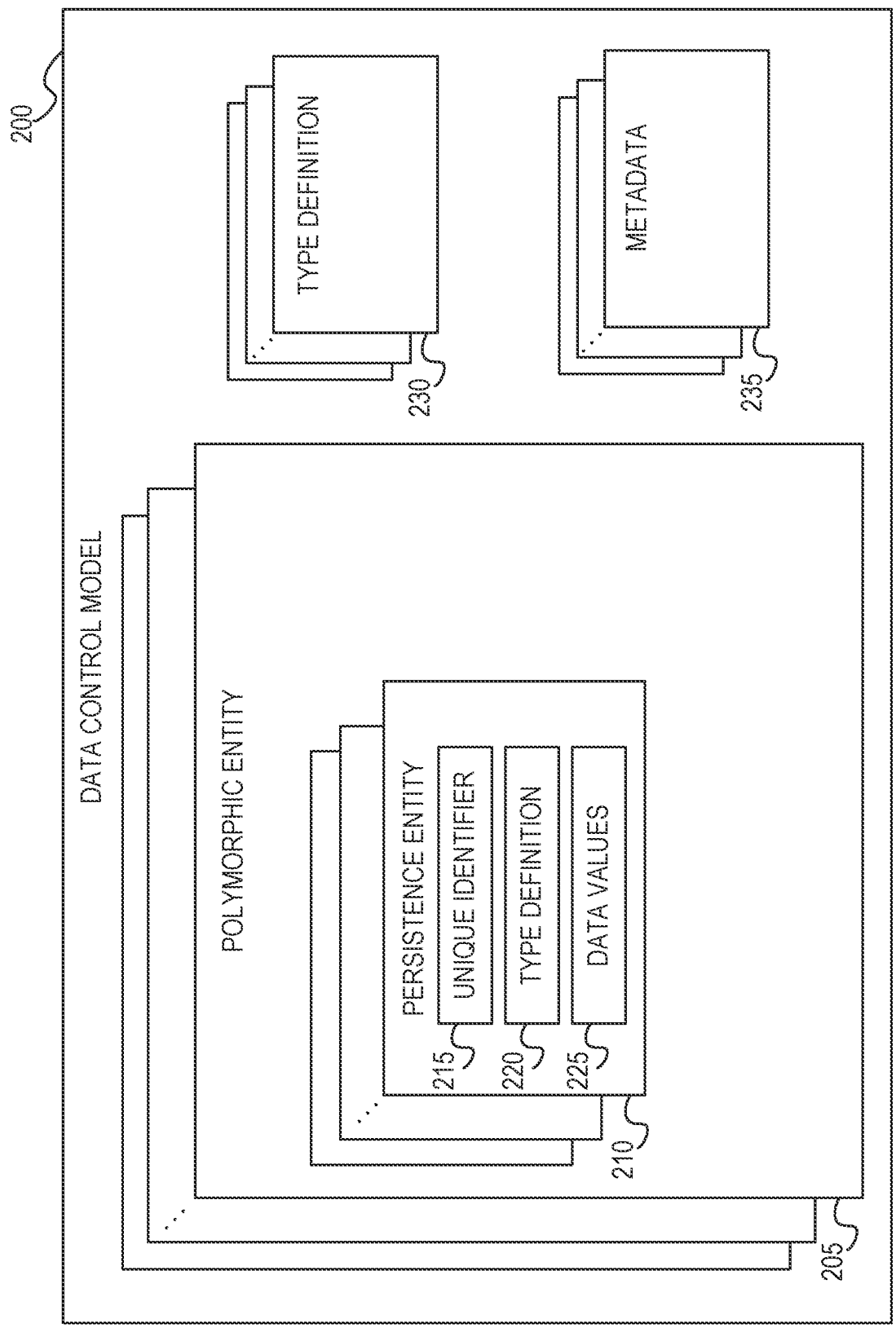
FIG. 2 shows a block diagram that illustrates components of a data control model in accordance with one or more embodiments.

FIG. 2 shows a block diagram that illustrates components of a data control model 200 in accordance with one or more embodiments. The data control model 200 may be an embodiment of an adaptive polymorphic data model. The data control model 200 may describe a database schema used by the client application 135. The server 110 may provide elements of the data control model 200 to the client application 135 from the datastore 115. The functionality and/or features of the client application 135 may be controlled as a function of the data control model 200. Thus, the client application 135 may provide different functionalities when provided with different elements of the data control model 200. Updates to the data control model 200 may be used to update the client application 135's functionality without updating the client application 135's executable code. Thus, new functionality may be added to the existing client application 135 by transmitting new elements of the data control model 200 to the existing client application 135 from the server 110.

In an example, a single client application 135 may be made available to any customer of a software provider via a central application download portal on a network. Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

For example, Company A may have a dedicated instance of the server 110 that only employees of Company A have access to via a set of client devices 130 that are issued to the employees of Company A by Company A. All of the client devices 130 used by employees of Company A may download the client application 135 from a publicly available application portal. In addition, Company B may have a dedicated instance of the server 110 that only employees of Company B have access to. The employees of Company B may access the server 110 via a set of client devices 130 that are issued by Company B to the employees of Company B. All of the client devices 130 used by employees of Company B may download the client application 135 from the same publicly available application portal as the employees of Company A. Company A's instance of the server 110 may download a data control model 200 customized for Company A to the client applications 135 on Company A's client devices 130. Company B's instance of the server 110 may download a data control model 200 customized for Company B to the client applications 135 on Company B's client devices 130. As a result, the client applications 135 for Company A's employees may provide different functionality than the client applications 135 for Company B's employees, even though the executable client application 135 downloaded from the publicly available application portal is the same for all of Company A's and all of Company B's client devices 130.

The data control model 200 may include one or more object type definitions 230. Each object type definition 230 may define an object type. The object type definition 230 may specify attributes of the object type. Examples of attributes may include sales order, delivery date, quantity, revenue, etc. The object type definition 230 may also specify the data format of an attribute, e.g., text string, length of text string, character, integer, signed integer, unsigned integer, floating point, double precision floating point, character or integer array, array dimensions, etc. The object type definition 230 may also specify default values for each attribute of the object type. The object type definition 230 may also specify which fields are mandatory for inclusion in each view of the defined object type, and which are mandatory for inclusion in a full canonical view of the defined object type. For example, a delivery date may be a mandatory field for a sales order data object type. The object type definition 230 may also specify which fields may be changed by the client application 135 and which fields may not be changed. For example, revenue may be a field for a sales order data object type that cannot be changed by the client application 135. The object type definition 230 may also specify the functions that the client application 135 is to use to communicate with the server 110 with regard to the object type. Examples of such functions may include fetch, update, delete, etc. The functions specified in the object type definition 230 include information to be used by the client application 135 to build URL's for communicating with the server 110 regarding the object defined by the respective object type definition 230. Such communications may include transmitting values of data fields of an object to the datastore 115 and updating a value of a data field of an object at the datastore 115. A URL may be specified to update the value of a data field of the object at the datastore 115.

The data control model 200 may also include one or more metadata modules 235. The metadata modules 235 may be embodied as data files or data objects. Each metadata module 235 may identify fields of an object type defined by the respective object type definition 230. For example, numerous different metadata modules 235 may identify a different set of fields of a same object type defined by the respective object type definition 230. Each of the different metadata modules 235 that correspond to the same object may define a different view or shape of the object type. The server 110 may store a complete or full canonical representation of the object type in the datastore 115. The client application 135 may download different subsets of the full set of fields of the object type stored in the datastore 115 to work with according to the metadata modules 235. Downloading a partial object from the datastore 115 may provide a savings in communications bandwidth over the network 120 and a savings in memory usage in the client device 130. The alternative of downloading the full canonical representation of the object type each time the object type is operated upon, regardless of what portions of the object type are to be operated upon, may be inefficient.

As an example, the client application 135 may use a metadata module 235 that represents a small subset of the fields of a data object type in order to download a list of data objects from the datastore 115. The client application 135 may use an HTTP request sent from the client device 130 to the server 110 to access the list of data objects in the datastore 115 that have a field value for a given field that matches a search parameter specified by the client application 135. The client application 135 may specify an object sub-type defined in the metadata module 235 so that the desired subsets of the fields of the data objects are downloaded, and not the complete or full canonical representations of the data objects. Thus, the sub-types defined in the metadata module 235 facilitate the client application 135 downloading a partial object from the datastore 115 rather than the full canonical object.

For example, a data object type may be a sales order. The client application 135 may download a list of sales orders for a specified customer, or a specified sales person, or a specified period of time, etc. The client application 135 may present the list of sales orders in a user interface. A user may select one or more of the presented list of sales orders to see more data regarding the sales orders or to perform operations upon the sales orders. In response to the user selection, the client application 135 may use a different metadata module 235 that represents a larger subset of the fields of the sales order data object type to download additional details regarding the selected one or more of the presented list of sales orders. The sales order data object type defined in a respective object type definition 230 may have a number of different associated metadata modules 235. Each of the metadata modules 235 may represent a different level of detail of the sales order data object type. The levels of detail may range from a minimal list view to a full canonical view that includes all the data fields of the sales order data object type.

In addition to specifying different views of objects defined in the object type definitions 230, the metadata modules 235 may also specify how the objects behave, interact with one another, interact with a user interface of the client application 135, and interact with the server 110. The metadata modules 235 may specify a layout of an object and offsets associated with each field of an object.

The data control model 200 may include one or more polymorphic entities 205. Each polymorphic entity 205 may define a different overall functionality for the data control model 200. When the client application 135 operates according to one polymorphic entity 205, the client application 135 may provide different features or functionality than when the client application 135 operates according to a different polymorphic entity 205.

Each polymorphic entity 205 may include one or more persistence entities 210. The persistence entities 210 of one instance of the polymorphic entity 205 may be different than the persistence entities 210 of a different instance of the polymorphic entity 205. Each instance of a persistence entity 210 may represent an instance of a data object as defined in a corresponding object type definition 230.

The persistence entity 210 may be an abstract representation of a data object. The persistence entity 210 may include a unique identifier 215 that uniquely identifies each instance of the persistence entity 210 within a specific polymorphic entity 205. The persistence entity 210 may also include an object type definition 220 that defines the object type represented by the persistence entity 210. The object type definition 220 may be an embodiment of a corresponding object type definition 230. The persistence entity 210 may also include a plurality of data values 225, each of which may be associated with a data field name as defined in the object type definition 220.

The persistence entity 210 may include functions defined by the object type definition 220 that operate on the data values 225 and interact with the datastore 115 with reference to a data object type as defined by the object type definition 220. Executable code included in the client application 135 that implements the persistence entity 210 may have no built-in information regarding the data objects represented by the object type definition 220. The executable code included in the client application 135 may provide functionality according to data included in the object type definition 220. In an embodiment, the persistence entity 210 may be implemented by Java code in the client application 135, and the object type definition 220 may be specified according to a JavaScript Object Notation (JSON) representation provided by the datastore 115. In various embodiments, other programming languages and database formats may be used to implement the persistence entities 210 in the client application 135. The Java code for the persistence entity 210 may be provided with the client application 135 at design time, while the JSON representation of the object type definition 220 may be provided via the datastore 115 at run time.

For example, an instance of a persistence entity 210 may be an object that is an instance of a sales order datatype that is defined according to a class that includes methods for operating on the sales order datatype. The class may be defined by the object type definition 230. According to the class definition, the persistence entity 210 may be able to build HTTP requests as appropriate to work with sales order data objects stored in the datastore 115, including fetching the sales order data objects, updating the sales order data objects, etc. Functions provided by the persistence entity 210 that operate on data objects stored in the datastore 115 may be defined generally to operate upon any type of data objects stored in the datastore 115. The functions provided by the persistence entity 210 may be called by methods provided in the class by which the persistence entity 210 is defined according to the object type definition 220. For example, rather than a hardcoded function named GetRevenue(<object identifier>) that is defined to only operate on a Revenue object, the executable code of the client application 135 may include a hardcoded function named Get( ) that may be called by a method of the class corresponding to a sales order data type persistence entity 210 on a field named Revenue as Get(Revenue, <object identifier>), where <object identifier> is the unique identifier 215 of the corresponding persistence entity 210.

In an example, when the client application 135 fetches a list of sales order data objects from the datastore 115, each sales order object returned may be represented by a separately defined instance of the persistence entity 210. The sales order data objects returned in the list may be represented as sub-types of the full canonical sales order data type stored in the datastore 115 according to a metadata module 235 corresponding to a list of the sales order data object type. A user may select one of the sales order data objects in the list to request the associated Revenue field value. The Revenue field may not be included in the sub-type of the sales order data type according to the metadata module 235 corresponding to the list. A Get(Revenue, <identifier>) function may be executed by the persistence entity 210 corresponding to the selected sales order data object. The Get function may look up the Revenue field in the persistence entity's object type definition 220 to determine what kind of data the Revenue field contains and look up the value for the field in the data values 225. If the value is not included in the data values 225, the Get function may issue an HTTP request to the datastore 115 according to a metadata module 235 that includes the field Revenue for the sales order data object type. After receiving the Revenue data field, and any other data fields defined by the metadata module 235 used by the Get function, the Get function may perform processing on the Revenue data value according to the class definition of the method corresponding to the Get function as specified by the object type definition 220. The persistence entity 210 may then present the Revenue data value returned by the Get function to the user via a user interface of the client application 135.

Each customer of the software provider may desire different functionality for the customer's respective client application 135 than the other customers. Rather than providing a different executable client application 135 to each different customer, the software provider may provide a same executable client application 135 to all customers. The software provider may also provide a different data control model 200 to each customer to be downloaded from each customer's respective server 110 to each respective customer's client applications 135.

In an embodiment, a particular customer of a software provider that provides the client application 135 to the particular customer may desire to update the functionality of the client application 135 used by the particular customer or under the particular customer's control. The updated functionality may include new data object type definitions 230 (e.g., for a new regional warehouse data object), new metadata modules 235, updates to either or both of existing data object type definitions 230 and metadata modules 235, etc. The particular customer may use a software tool to update the data control model 200 at the particular customer's server 110. The particular customer may transmit the updated data control model 200 to the particular customer's one or more instances of the particular customer's client application 135 on various client devices 130 under the particular customer's control. The particular customer's update of the particular customer's client application 135 on various client devices 130 under the particular customer's control may not affect instances of the client application 135 provided by the software provider to other customers of the software provider. All customers of the software provider may install and use a same executable client application 135. The particular customer may update the data control model 200 used by the particular customer's instances of the client application 135 without affecting any other instances of the client application 135.

In an embodiment, a salesperson may use the client application 135 to display a list of sales opportunities. Each of the sales opportunities may be represented by an object type Opportunities in the data control model 200 of the client application 135. In response to a request from the salesperson, the client application 135 may display a list of values of data fields from the Opportunities objects that meet the salesperson's criteria. The client application 135 may determine, based on the configuration of the client application 135, that only the customer name and the customer phone number are displayed in a list view of opportunities. The client application 135 may analyze a metadata module 235 corresponding to the object type Opportunity. The client application 135 may determine that the metadata module 235 corresponding to the object type Opportunity includes the to-be-displayed fields, customer name and customer phone number. The client application 135 may retrieve values for fields identified in the corresponding metadata module 235 from the datastore 115. As the fields to-be-displayed are included in the corresponding metadata module 235, the client application 135 may retrieve values for the customer name and the customer phone number from objects of type Opportunity stored in the datastore 115. The client application 135 may display, in a list view, the retrieved information for different opportunities.

In addition to storing the values for customer name and customer number, the datastore 115 may also store values for a field customer budget in the object type Opportunity. However, the client application 135 may not obtain a copy of the values corresponding to customer budget as customer budget is not identified in corresponding metadata module 235 used by the client application 135.

In an embodiment, the client application 135 may receive a user request for a value of a field of an object that is not included in the corresponding metadata module 235. The client application 135 may search the metadata modules 235 for another corresponding metadata module 235 that does include the requested field for the specified object type. The client application 135 may then download the object from the datastore 115 according to the other corresponding metadata module 235 that does include the requested field. The client application 135 may modify the locally stored partial copy of the object, previously retrieved from the server, to include the fields and values obtained from the datastore 115 corresponding to the other corresponding metadata module 235 that does include the requested field for the specified object type.

Continuing the above example, the client application 135 may receive a selection of a particular opportunity from the salesman when the client application 135 is displaying opportunities in the list view. The client application 135 may be configured to show a detailed view of an opportunity in response to receiving a selection of that opportunity. The client application 135 may determine that the detailed view of an opportunity includes a customer name, a customer phone number, and a customer budget. The client application 135, based on an analysis of the corresponding metadata module 235, may determine that the corresponding metadata module 235 identifies the fields customer name and customer phone number. The client application 135 may further determine that the corresponding metadata module 235 does not identify the field customer budget. Since the corresponding metadata module 235 does not identify the field customer budget, any version of an object, corresponding to the particular opportunity, which is stored by the client application according to the corresponding metadata module 235 may be determined to not include values for the field customer budget. The client application 135 may identify a different metadata module 235 in the data control model 200 corresponding to the object type Opportunity that does include the desired field customer budget. The client application 135 may then request, from the datastore 115 on the server 110, values corresponding to the fields identified in the different metadata module 235 that does include the field customer budget. Specifically, the client application 135 may request the object of type Opportunity which corresponds to the particular opportunity selected by the salesman. In response to transmitting the request, the client application 135 may receive an object of type Opportunity and corresponding to the particular opportunity selected by the salesman. The object may include values for customer name, customer number, and customer budget which are all now identified in the different metadata module 235 maintained by the client application 135 that is now selected to define the view of the particular object. Alternatively, the object received from the datastore 115 may not include values for the customer name and customer number if no change has been made to the values since the last time the values were received by the client application 135. The client application 135 may replace or overwrite any stored prior version of the object corresponding to the particular opportunity. The client application 135 may store a new version of the object, corresponding to the particular opportunity, and including customer name, customer phone number, and customer budget. The client application 135 may display a detailed view of the particular opportunity selected by the salesman. The detailed view, displayed by the client application 135, may include the customer name, the customer number, and the customer budget.

In an embodiment, an application on the server 110 may receive a request to create a new integer field of type Commission for an object of the type Opportunity stored in the datastore 115. The field type Commission may not currently be identified as a field in any object type definition 230 or metadata module 235 maintained by the client application 135 or maintained by the server 110. The server 110 may update the object type definition 230 corresponding to the object type Opportunity and one or more corresponding metadata modules 235 maintained by the client application 135. Specifically, the updates to the object type Opportunity and one or more corresponding metadata modules 235 include a new integer field of type Commission. The datastore 115 and the client application 135 may store values for the field of type Commission to reflect the addition of the new field of type Commission. The client application 135 may also retrieve and display values corresponding to the field Commission on a user interface.

In an embodiment, the server 110 may receive a request to generate a new type of an object that is different than the types of any objects stored in the datastore 115 and/or the client application 135. Responsive to the request to generate an object of a new type, the server 110 may (a) generate a new object type definition 230 and (b) generate one or more new metadata modules 235 corresponding to the new object type. The object type definition 230 may include one or more data fields to be included in the new type of object, and the one or more metadata modules 235 may specify different subsets of the one or more data fields to be included in the new type of object. The server 110 may synchronize the new object type definition 230 and the new one or more metadata modules 235 with the client application 135 by updating the data control model of the client application 135. Accordingly, the server 110 and the client application 135 may use the object type definitions 230 and the metadata modules 235 to define new object types. The server 110 may add a new object type to a collection of object types defined by the server 110 and used by the client application 135.

Continuing the above example, the server 110 may receive a request to create a new object of type NetworkingEvent. The request may further specify three fields Date, Time, and Location as fields of the object of the type NetworkingEvent. Neither the client application 135 nor the server 110 may include an object type definition 230 or metadata module 235 defining any object of type NetworkingEvent. Responsive to receiving the request, the server 110 may generate an object type definition 230 and one or more metadata modules 235 corresponding to the object type NetworkingEvent. The object type definition 230 and one or more metadata modules 235 corresponding to the object type NetworkingEvent may identify at least three fields Date, Time, and Location. The server 110 may transmit the object type definition 230 and one or more metadata modules 235 to the client application 135 to provide a definition the object type NetworkingEvent. The client application 135 may also generate objects of type NetworkingEvent and transmit the objects to the server 110 for synchronization.

4. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

4.1 Modifying a Polymorphic Data Model

Figure 3:
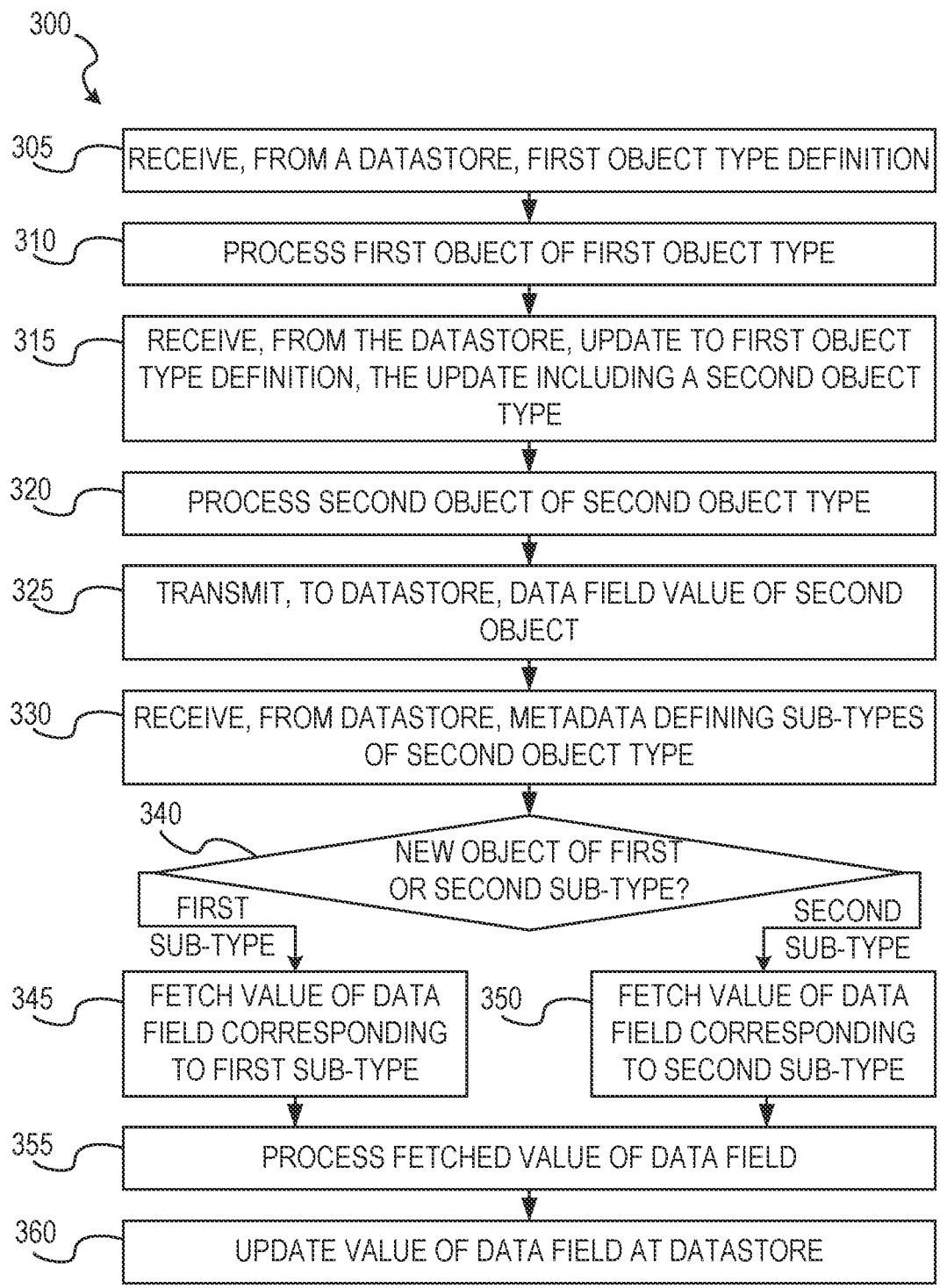
FIG. 3 shows a block diagram that illustrates an example set of operations for updating an object type definition in accordance with one or more embodiments.

FIG. 3 shows a block diagram that illustrates an example set of operations 300 for updating an object type definition in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an operation 305, a client application 135 may receive a first object type definition 230 from a datastore 115. The first object type definition 230 may be received by a client device 130 on which the client application 135 executes over a network 120 from a server 110 that hosts the datastore 115. The first object type definition 230 may define a first object type to be used in a data control model 200 that controls the functionality of the client application 135. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field.

In an operation 310, a first object of the first object type may be processed according to the received first object type definition 230. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 315, the client application 135 may receive an update to the first object type definition 230 from the datastore 115. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 320, a second object of the second object type may be processed according to the received second object type definition 230. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 325, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may update the value of the Customer Budget stored in the Opportunity object in the datastore 115. The client application 135 may transmit a value of the Customer Budget when the second object type is an Opportunity with an updated list of data fields compared to the first object type.

In an operation 330, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130. When only the Customer Name field is needed to be presented in the user interface of the client application 135, the full canonical representation of the Opportunity objects may not be needed, and the list sub-type may be more efficient. Another method for the Opportunity object type may download the full canonical representation of a selected Opportunity object according to the full canonical sub-type metadata module 235. When one Opportunity object in the list of Opportunity objects is selected for viewing and/or editing all the data fields of the selected Opportunity object, the full canonical representation of the Opportunity objects may be needed, and the list sub-type may be insufficient.

In an operation 340, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 345, if the new object is determined to correspond to the first sub-type of the second object type definition 230 in operation 340, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 350, if the new object is determined to correspond to the second sub-type of the second object type definition 230 in operation 340, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 355, the client application 135 may process the value of the data field fetched in either of operations 345 or 350. For example, the client application 135 may display the value of the fetched data field in the user interface of the client application 135. The client application 135 may perform a mathematical computation on the value of the fetched data field and display the results of the mathematical computation in the user interface of the client application 135.

In an operation 360, the client application 135 may cause a value of the data field processed in operation 355 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 345 and 350 according to the results of the processing of the fetched value of the data field in operation 355.

Figure 4:
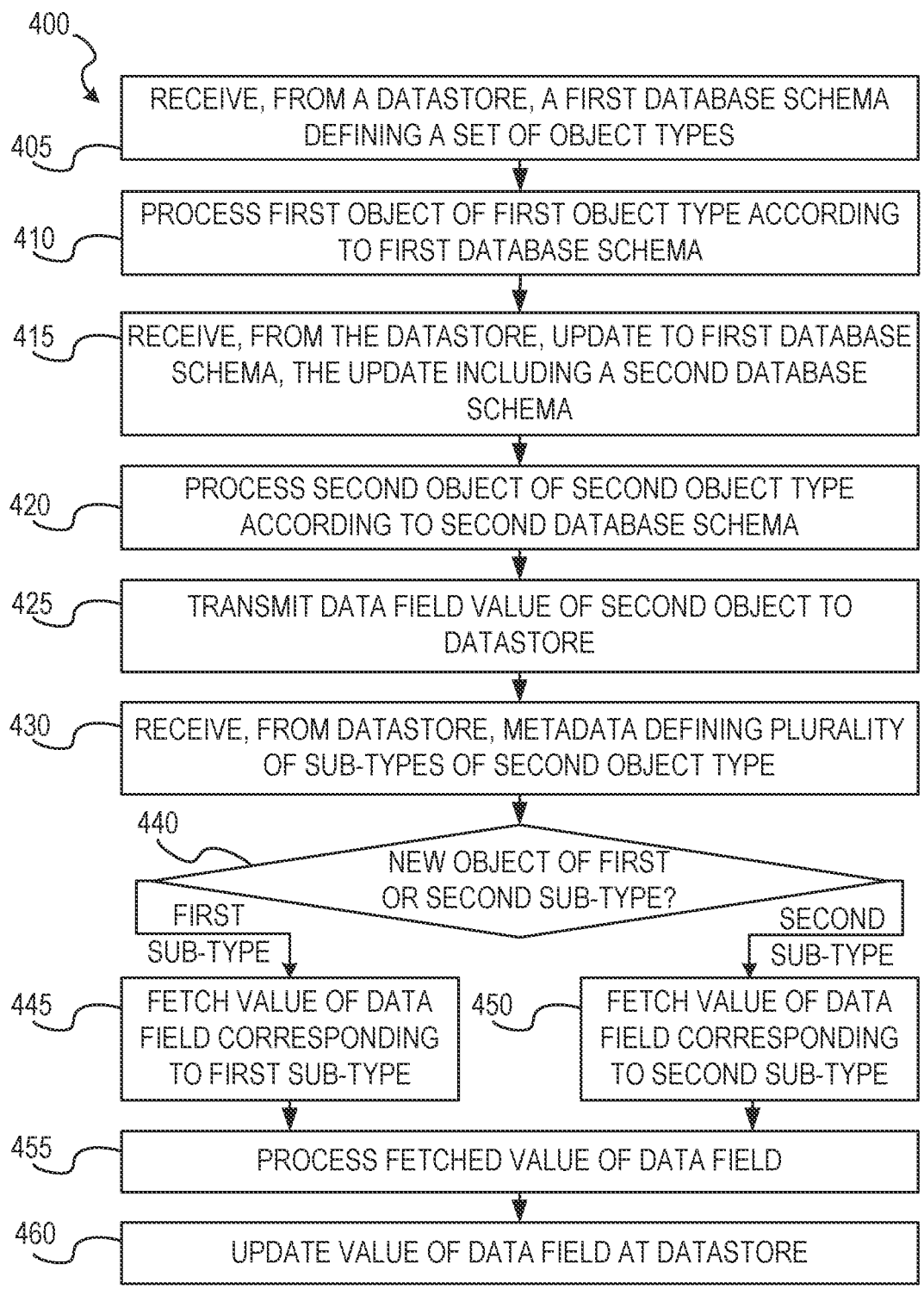
FIG. 4 shows a block diagram that illustrates an example set of operations for updating an object type definition in accordance with one or more embodiments.

FIG. 4 shows a block diagram that illustrates an example set of operations 400 for updating an object type definition in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an operation 405, a client application 135 may receive a first database schema, e.g., a data control model 200 that controls the functionality of the client application 135, from a datastore 115. The first database schema may be received by a client device 130 on which the client application 135 executes over a network 120 from a server 110 that hosts the datastore 115. The first database schema may include a first object type definition 230 that defines a first object type. The first object type definition 230 may define one or more data fields of the first object type. Each defined data field may include a data field name and a data field value. As an example, the object type may be an Opportunity, for example, a sales opportunity. The object type Opportunity may be defined by the first object type definition 230 to include numerous data fields, for example, a Customer Name field and a Customer Phone Number field. The first database schema may also include one or more metadata modules 235 that each define a view of the first object type defined by the first object type definition 230. Each of the one or more metadata modules 235 may specify a different subset of data fields included in the full canonical representation of the first object type to be included in the respective view. As an example, one view defined by one of the metadata modules 235 may specify only the Customer Name field be included from the various fields specified by the full canonical Opportunity object type. Another view defined by another of the metadata modules 235 may specify that both the Customer Name field and a Customer Phone Number field be included from the various fields specified by the full canonical Opportunity object type.

In an operation 410, a first object of the first object type may be processed according to the received first database schema. For example, the client application 135 may generate a persistence entity 210 to represent an instance of the first object according to the first object type definition 230. The generated persistence entity 210 may include a unique identifier 215 that uniquely identifies the first object within the polymorphic entity 205 that represents the first database schema used by the client application 135. The generated persistence entity 210 may also include an object type definition 220 based on a copy of the first object type definition 230 upon which the generated persistence entity 210 is based. The persistence entity 210 may also include one or more data fields having associated data values 225 according to the object type definition 220. As another example, a user interface of the client application 135 may display one or more data field values of the first object. The persistence entity 210 may also perform one or more methods associated with a class defined by the object type definition 220 to operate upon the first object represented by the persistence entity 210.

In an operation 415, the client application 135 may receive an update to the first database schema from the datastore 115. The update to the first database schema may include a second database schema different from the first database schema. The update may include a second object type definition 230. The second object type definition 230 may define a second object type to be used in the data control model 200 that controls the functionality of the client application 135. The second object type definition 230 may define one or more data fields of the second object type. Each defined data field may include a data field name and a data field value. As an example, the object type may be a Warehouse. The object type Warehouse may be defined by the second object type definition 230 to include numerous data fields, for example, a Warehouse Address field and a Warehouse Phone Number field. As another example, the second object type definition 230 may be an updated version of the first object type definition 230 and replace the first object type definition 230 in the data control model 200 of the client application 135. The second object type definition 230 may be an Opportunity, for example, a sales opportunity. The updated second object type Opportunity may be defined by the second object type definition 230 to include numerous data fields, for example, a Customer Name field, a Customer Phone Number field, and Customer Budget field. In this example, the second object type definition 230 includes an additional data field and value that are not included in the first object type definition 230.

In an operation 420, a second object of the second object type may be processed according to the received second database schema. For example, the client application 135 may generate a persistence entity 210 to represent an instance of the second object according to the second object type definition 230. The generated persistence entity 210 may include a unique identifier 215 that uniquely identifies the second object within the polymorphic entity 205 that represents the schema used by the client application 135. The generated persistence entity 210 may also include an object type definition 220 based on a copy of the second object type definition 230 upon which the generated persistence entity 210 is based. The persistence entity 210 may also include one or more data fields having associated data values 225 according to the object type definition 220. As another example, a user interface of the client application 135 may display one or more data field values of the second object. The persistence entity 210 may also perform one or more methods associated with a class defined by the object type definition 220 to operate upon the second object represented by the persistence entity 210. As another example, when the second object type definition 230 is an updated version of the first object type definition 230 and replaces the first object type definition 230 in the data control model 200 of the client application 135, the persistence entity 210 representing the first object of the first object type may be updated to include the object type definition 220 based on a copy of the second object type definition 230 and represent an instance of the second object of the second object type accordingly. The persistence entity 210 may also be updated to include one or more additional data fields having associated data values 225 according to the updated object type definition 220.

In an operation 425, the client application 135 may transmit a data field value of the second object to the datastore 115. For example, the client application 135 may transmit a value of the Warehouse Phone Number when the second object type is a Warehouse, and thereby update the Warehouse Phone Number stored for the Warehouse object in the datastore 115. As another example, the client application 135 may transmit a value of the Customer Budget when the second object type is an Opportunity with an updated list of data fields compared to the first object type, and thereby update the value of the Customer Budget stored in the Opportunity object in the datastore 115.

In an operation 430, the client application 135 may receive one or more metadata modules 235 from the datastore 115. The metadata modules 235 may define sub-types of the second object type defined by the second object type definition 230. For example, a first metadata module 235 may define a full canonical sub-type of the Opportunity object type that includes the Customer Name field, the Customer Phone Number field, and the Customer Budget field. A second metadata module 235 may define a subset sub-type of the Opportunity object type that includes the Customer Name field and the Customer Phone Number field. A third metadata module 235 may define a list sub-type of the Opportunity object type that includes the Customer Name field only. A method for the Opportunity object type may download a list of Opportunity objects according to the list sub-type metadata module 235 to minimize data transmission overhead and data storage overhead in the client device 130 when only the Customer Name field is needed to be presented in the user interface of the client application 135. Another method for the Opportunity object type may download the full canonical representation of a selected Opportunity object according to the full canonical sub-type metadata module 235 when one Opportunity object in the list of Opportunity objects is selected for viewing and/or editing all the data fields of the selected Opportunity object.

In an operation 440, the client application 135 may make a determination regarding whether a new object that is created according to the second object type definition 230 is a first sub-type, e.g., created according to the list sub-type of the Opportunity object type, or a second sub-type, e.g., created according to the full canonical sub-type of the Opportunity object type.

In an operation 445, if the new object is determined to correspond to the first sub-type of the second object type definition 230 in operation 440, the client application 135 may fetch a value of a data field corresponding to the first sub-type from the datastore 115. For example, when the first sub-type of the Opportunity object type is the list sub-type, the client application 135 may fetch a value of the Customer Name data field from the datastore 115.

In an operation 450, if the new object is determined to correspond to the second sub-type of the second object type definition 230 in operation 440, the client application 135 may fetch a value of a data field corresponding to the second sub-type from the datastore 115. For example, when the second sub-type of the Opportunity object type is the full canonical sub-type, the client application 135 may fetch a value of the Customer Budget data field from the datastore 115.

In an operation 455, the client application 135 may process the value of the data field fetched in either of operations 445 or 450. For example, the client application 135 may display the value of the fetched data field in the user interface of the client application 135, or the client application 135 may perform a mathematical computation on the value of the fetched data field and display the results of the mathematical computation in the user interface of the client application 135.

In an operation 460, the client application 135 may cause a value of the data field processed in operation 455 to be updated at the datastore 115. The client application 135 may perform a method defined by the second object type definition 230 represented in the object type definition 220 of the persistence entity 210. The method performed may include transmitting an HTTP request to the datastore 115 to update the value of the data field fetched in one of operations 445 and 450 according to the results of the processing of the fetched value of the data field in operation 455.

Figure 5:
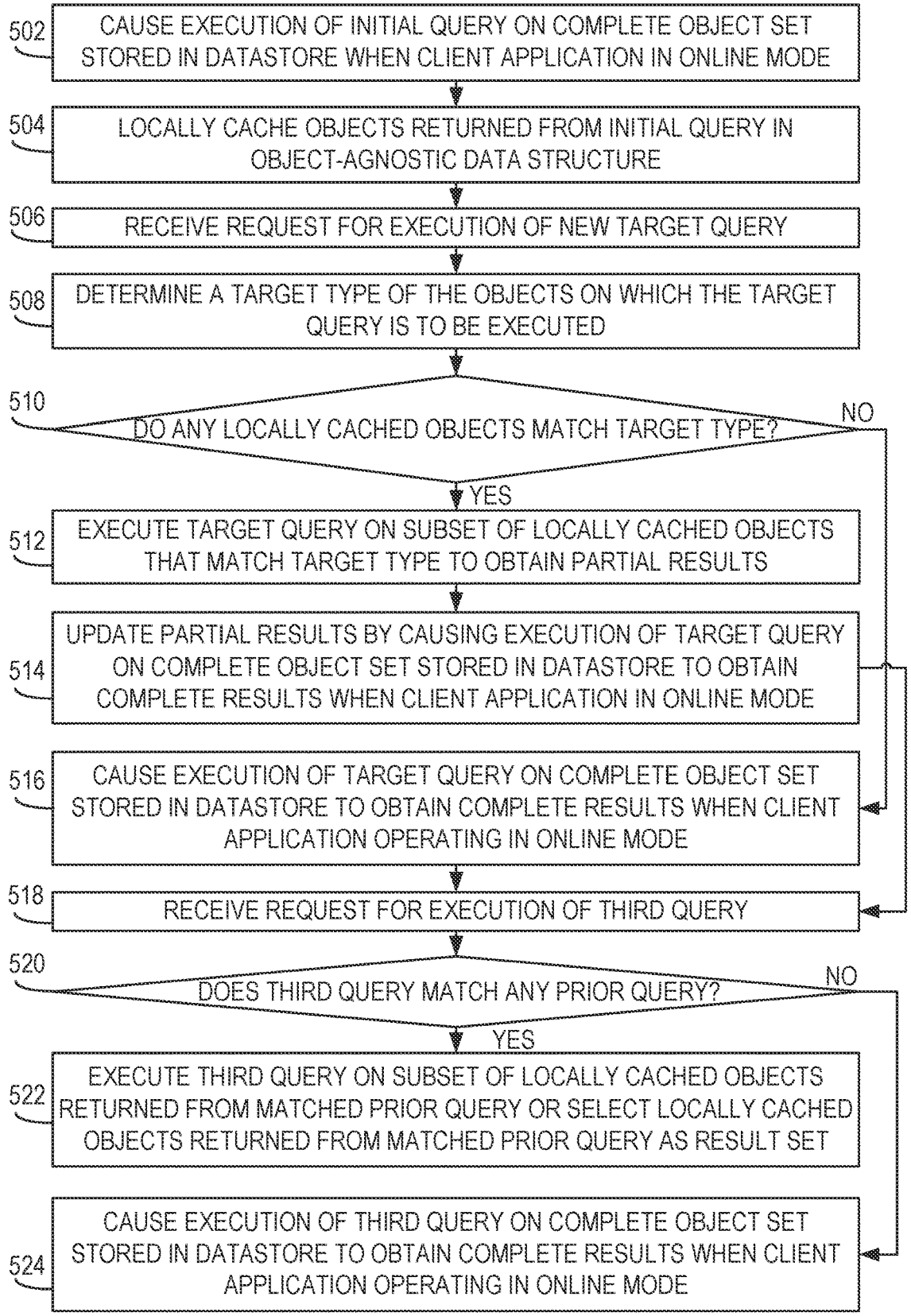
FIG. 5 shows a block diagram that illustrates an example set of operations for providing partial search results without waiting for completion of a search of a complete set of objects stored at a server in accordance with one or more embodiments.

4.2 Caching Objects from a Set of Query Results in an Object-Agnostic Data Structure for Use in Subsequent Queries FIG. 5 shows a block diagram that illustrates an example set of operations 500 for providing partial search results without waiting for completion of a search of a complete set of objects stored at a server 110 in accordance with one or more embodiments. The operations 500 illustrated in FIG. 5 may be altered, re-arranged, deleted, or otherwise modified in various embodiments. Accordingly, the order or combination of operations illustrated in FIG. 5 should not be construed as limiting the scope of any of the claims.

The operations 500 may be performed by the client application 135 executing on the client device 130 remote from the datastore 115 and the server 110. The client device 130 and the server 110 may be considered remote when the client device 130 and the server 110 are located in different rooms, different buildings, on different streets, in different cities, or otherwise in different geographical regions. The client device 130 and the server 110 may be considered remote when the client device 130 and the server 110 communicate over the network 120 that uses an Open Systems Interconnection model (OSI model) network layer protocol or higher layer protocol instead of an OSI data link layer protocol or lower layer protocol.

The client application 135 may generate the partial search results by a search performed on a client device 130. The client application 135 may perform the search on a partial set of objects downloaded from a datastore 115 at the server 110 in response to a prior search and stored in a local object-agnostic data structure. The partial search results may not include the complete set of objects stored in the datastore 115 that would meet the search conditions. The partial search results may be subsequently updated with complete search results based on the complete set of objects stored in the datastore 115 upon availability of the server 110 and the datastore 115.

In an operation 502, the client application 135 may cause execution of an initial query on the complete object set stored in the datastore 115 at the server 110 when the client application 135 is in an online mode. The client application 135 may be in an online mode when the client device 130 is communicatively coupled with the server 110 over the network 120. The initial query may be in response to a request received by the client application 135, for example, from a user via a user interface on the client device 130 at runtime of the client application 135. The user interface may include a query definition interface. The query definition interface may include a list of pre-defined queries from which the user may select the initial query. The initial query may include a runtime modification of a pre-defined query selected from a list of pre-defined queries.

The client application 135 may form the initial query as a uniform resource identifier (URI) that identifies the datastore 115 and includes the initial query. The URI may also identify the server 110 that hosts the datastore 115. The URI may be formed as a uniform resource locator (URL) and transmitted to the server 110 over the network 120. The client application 135 may store the URI formed to represent the initial query on the client device 130 for access and retrieval.

The client application 135 may transmit a request to execute the initial query to the server 110. The initial query may be executed by the server 110. In some embodiments, the initial query may search a set of objects stored in the datastore 115 that is less than the complete set of objects. For example, if the initial query specifies a specific object type to include in the searched set of objects, only the objects in the datastore 115 that are of the specified type may be included in the search. The initial query may result in a selected set of objects from the datastore 115 that match search conditions of the query. The selected set of objects may all be of a same object type.

In an operation 504, the client application 135 may locally cache objects returned from the datastore 115 in response to the initial query. The returned objects may be collectively referred to as an initial result set. The initial result set may be generated by the server 110 by executing the initial query on the datastore 115. The initial result set may be a subset of the objects stored in the datastore 115 that match the initial query. The client application 135 may locally store the initial result set in an object-agnostic data structure. Storing the initial result set may include storing objects included in the initial result set. Multiple different types of objects and multiple different result sets from different queries may be stored in the same object-agnostic data structure.

The client application 135 may also display the initial result set received from the server 110 in response to receiving the requests to execute the initial query. The client application 135 may format or otherwise modify for display the initial result set. As an example, a first n number of results may be displayed, with the remaining results being accessible by scrolling or tabbing. Objects within the initial result set may be formatted in accordance with an interface displayed by the client application 135.

The object-agnostic data structure may be an embodiment of the data control model 200 disclosed herein with respect to FIGS. 2-4. The client application 135 may store a mapping between the initial result set and the initial query. The stored URI formed to represent the initial query may be mapped to the initial result set. The client application 135 may apply a hash function to the initial query to generate a first identifier. The client application 135 may store the first identifier in association with the initial result set corresponding to the initial query.

In an operation 506, the client application 135 may receive a request for execution of a new query, referred to herein as a target query. The client application 135 may receive the target query from a user via a user interface on the client device 130. The client application 135 may apply a hash function to the target query to generate a target identifier. The client application 135 may store the target identifier in association with the target query. The client application 135 may form a target URI to represent the target query. The client application 135 may store the target URI in association with the target query.

In an operation 508, the client application 135 may determine that the target query is to be executed on objects of a second type. The second type may be different from or the same as the object type of the objects returned in the result set of the initial query. The type of the object may be defined according to the object type definition 230 discussed above with reference to FIG. 2.

In an operation 510, the client application 135 may determine whether any locally cached objects, e.g., objects stored in the object-agnostic data structure on the client device 130, have a type that matches the second type. The client application 135 may search through all locally cached objects to determine whether any locally cached objects have a type that matches the second type. The locally cached objects may be mapped to a list of corresponding object types. The client application 135 may check the list of corresponding object types mapped to the locally cached objects to determine whether any locally cached objects have a type that matches the second type. When the client application 135 determines that one or more locally cached objects have a type that matches the second type, operation 512 may be performed next. When the client application 135 determines that no locally cached objects have a type that matches the second type, operation 516 may be performed next.

In an operation 512, after the client application 135 determines that one or more locally cached objects have a type that matches the second type, the client application 135 may execute the target query on at least a subset of the locally cached objects that match the second type. In an example, only the locally cached objects that are of the second type may be selected to be included in the search. In an embodiment, locally cached objects that are marked to be deleted may not be selected to be included in the search. The client application 135 may select a subset of the objects returned from the datastore 115 in response to the initial query as part of the initial result set to be included in the search if the type of the objects of the initial result set matches the second type. The client application 135 may make the determination of the subset of the objects selected to be included in the query at runtime. Responsive to determining that the second type does not match a third type of a third set of locally cached objects, the client application 135 may refrain from selecting the third set of objects for inclusion in the search.

The client application 135 may translate the target query for execution on the object-agnostic data structure that includes the subset of the objects returned from the datastore 115 in response to the initial query as part of the initial result set. Translating the target query may include determining the object type of the target query and adding the object type of the target query as a query parameter to the second query. In an embodiment, the object type of the target query may be added as a parameter of the URI representing the second query.

The client application 135 may generate a target result set from executing the target query on the locally cached objects stored on the client device 130. The locally cached objects stored on the client device 130 may be a subset of the complete set of objects stored in the datastore 115. Thus, the target result set may be a partial result set, including a subset of the objects that would have been returned had the search been performed on the complete set of objects stored in the datastore 115. The client application 135 may execute the target query on the locally cached objects responsive to determining that there is no current access to the on the locally cached objects datastore 115 on the server 110 via the network 120, or responsive to determining that the client application 135 is in an offline mode. The client application 135 may execute the target query on the locally cached objects even when the client application 135 is in an online mode and there is current access to the datastore 115 on the server 110 via the network 120. Simultaneous execution of the target query on the locally cached objects and the datastore 115 may produce at least the partial target result set sooner than a complete target result set could be obtained by causing execution of the target query on the server 110.

The client application 135 may store a mapping between the target result set and the target query. The client application 135 may store and/or map the URI and/or identifier representing the target query to the target result set.

In an operation 514, the client application 135 may update the target result set by causing execution of the target query on the complete object set stored in the datastore 115 by the server 110 when the client application 135 is in an online mode. Operation 514 may be performed subsequent to obtaining the target result set in operation 512. Operation 512 may be performed faster than operation 514. Therefore, operation 514 may be performed concurrently with operation 512 when the client application 135 is in an online mode and/or there is current access to the datastore 115 on the server 110 via the network 120. The client application 135 may cause execution of the target query by the server 110 responsive to determining that the client application 135 is in an online mode. The client application 135 may cause execution of the target query by the server 110 responsive to determining that there is current access to the datastore 115 on the server 110 via the network 120. The execution of the target query on the complete object set stored in the datastore 115 may generate a third result set that includes a third set of objects corresponding to the target query.

The client application 135 may form the target query to be executed by the server 110 as an external target query URI that identifies the datastore 115 and includes the target query. The URI may also identify the server 110 that hosts the datastore 115. The external target query URI may be formed as a URL and transmitted to the server 110 over the network 120. The client application 135 may store the external target query URI formed to represent the external target query on the client device 130 for access and retrieval. The client application 135 may locally cache objects returned from the datastore 115 in response to the external target query. The client application 135 may update the target results from the locally performed target query with the results from the externally performed target query.

The client application 135 may replace the mapping between the local target query result set and the local target query with a mapping between the external target query result set and the local target query. The stored local target query URI formed to represent the local target query may be mapped to the external target query result set instead of the original local target query result set. The client application 135 may apply a hash function to the external target query to generate an external target query identifier and store the external target query identifier in association with the external target query result set corresponding to the external target query. Any local target query identifier previously stored in association with the local target query results may be replaced with the external target query identifier when the local target query results are updated with the external target query results.

The client application 135 may store a mapping between the external target query result set and the external target query. The stored external target query URI formed to represent the external target query may be mapped to the external target query result set. The client application 135 may apply a hash function to the external target query to generate an external target query identifier and store the external target query identifier in association with the external target query result set corresponding to the external target query.

In an operation 516, the client application 135 may cause execution of the target query on the complete object set stored in the datastore 115 by the server 110 when the client application 135 is in an online mode. Operation 514 may be performed when the target query cannot be performed locally by the client application 135. The client application 135 may cause execution of the target query by the server 110 responsive to determining that the client application 135 is in an online mode and/or there is current access to the datastore 115 on the server 110 via the network 120. The execution of the target query on the complete object set stored in the datastore 115 may generate a target result set that includes a complete target set of objects corresponding to the target query.

The client application 135 may form the target query to be executed by the server 110 as an external target query uniform resource identifier (URI) that identifies the datastore 115 and includes the target query. The URI may also identify the server 110 that hosts the datastore 115. The external target query URI may be formed as a uniform resource locator (URL) and transmitted to the server 110 over the network 120. The client application 135 may store the external target query URI formed to represent the external target query on the client device 130 for access and retrieval. The client application 135 may locally cache objects returned from the datastore 115 in response to the external target query.

The client application 135 may store a mapping between the external target query result set and the external target query. The stored external target query URI formed to represent the external target query may be mapped to the external target query result set. The client application 135 may apply a hash function to the external target query to generate an external target query identifier and store the external target query identifier in association with the external target query result set corresponding to the external target query.

In an operation 518, the client application 135 may receive a request for execution of a third query. The third query may be received from a user via a user interface on the client device 130. The client application 135 may apply a hash function to the third query to generate a third identifier and may store the third identifier in association with the third query. The client application 135 may form a third URI to represent the third query and may store the third URI in association with the third query.

In an operation 520, the client application 135 may determine whether the third query matches any prior query. The client application 135 may search through all locally stored prior queries to determine whether any of the locally stored prior queries match the third query. To make the determination regarding the match, the client application 135 may compare the third identifier with the stored identifier of each of the locally stored prior queries or compare the third URI with the stored URI of each of the locally stored prior queries. To make the determination regarding the match, the client application 135 may compare query strings. When the client application 135 determines that a locally stored prior query matches the third query, operation 522 may be performed next. When the client application 135 determines that no locally stored prior query matches the third query, operation 524 may be performed next.

In an operation 522, after the client application 135 determines that a locally stored prior query matches the third query, the third query may be executed on at least a subset of the locally cached objects that were included in the result set of the matched prior query to generate a third result set, or the locally cached objects returned as the result set of the matched prior query may be selected as the third result set of the third query. In an embodiment, locally cached objects that are marked to be deleted may not be selected to be included in the search or be included in the result set of the third query, even if they were included in the result set of the matched query.

The locally cached objects stored on the client device 130 may be a subset of the complete set of objects stored in the datastore 115. Thus, the third result set may be a partial result set, including a subset of the objects that would have been returned had the search been performed on the complete set of objects stored in the datastore 115. The client application 135 may execute the third query on the locally cached objects responsive to determining that there is no current access to the on the locally cached objects datastore 115 on the server 110 via the network 120, or responsive to determining that the client application 135 is in an offline mode. The client application 135 may execute the third query on the locally cached objects even when the client application 135 is in an online mode and there is current access to the datastore 115 on the server 110 via the network 120. The third query may be executed in order to produce at least the partial third result set sooner than a complete third result set could be obtained by causing execution of the third query on the server 110.

The client application 135 may store a mapping between the third result set and the third query. The client application 135 may store and/or map the third URI and/or third identifier representing the third query to the third result set.

In an operation 524, the client application 135 may cause execution of the third query on the complete object set stored in the datastore 115 by the server 110 when the client application 135 is in an online mode. Operation 524 may be performed when the third query cannot be performed locally by the client application 135. The client application 135 may cause execution of the third query by the server 110 responsive to determining that the client application 135 is in an online mode. The client application 135 may cause execution of the third query by the server 110 responsive to determining that there is current access to the datastore 115 on the server 110 via the network 120. The execution of the third query on the complete object set stored in the datastore 115 may generate a third result set that includes a complete third set of objects corresponding to the third query.

The client application 135 may form the third query to be executed by the server 110 as an external third query URI that identifies the datastore 115 and includes the third query. The external third query URI may also identify the server 110 that hosts the datastore 115. The external third query URI may be formed as a URL and transmitted to the server 110 over the network 120. The client application 135 may store the external third query URI formed to represent the external third query on the client device 130 for access and retrieval. The client application 135 may locally cache objects returned from the datastore 115 in response to the external third query.

The client application 135 may store a mapping between the external third query result set and the external third query. The stored external third query URI formed to represent the external third query may be mapped to the external third query result set. The client application 135 may apply a hash function to the external third query to generate an external third query identifier. The client application 135 may store the external third query identifier in association with the external third query result set corresponding to the external third query.

Figure 6:
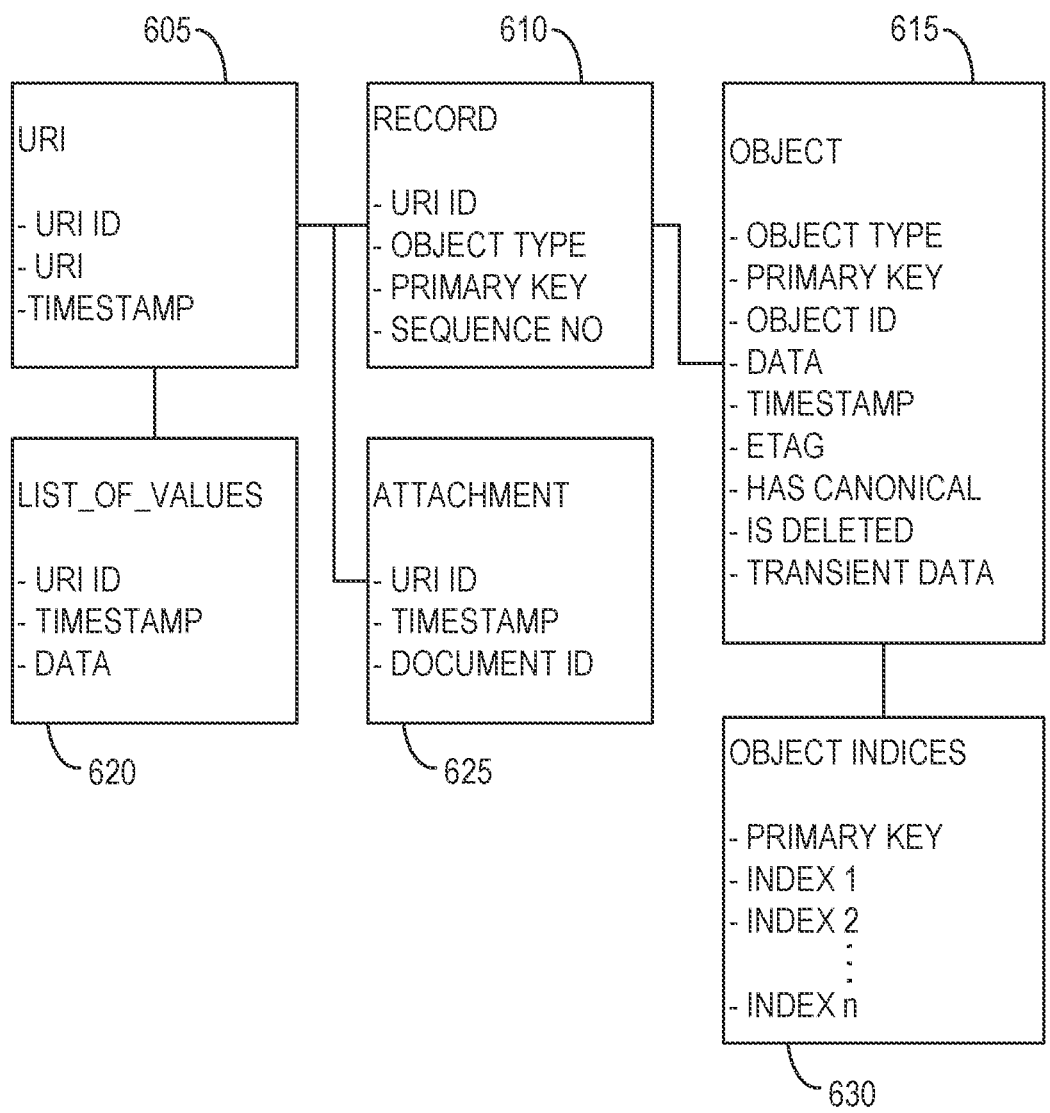
FIG. 6 shows a block diagram that illustrates components of an object-agnostic data model in accordance with one or more embodiments.

FIG. 6 shows a block diagram that illustrates components of an object-agnostic data structure 600 in accordance with one or more embodiments. A URI table entry 605 that represents a query may include an identifier URI ID as well as a URI and a timestamp of when the URI was created and/or used to perform a query. The URI may include a URL. An instance of a URI table entry 605 may record the URI associated with each query performed by or caused to be performed by the client application 135. The collection of URI table entries 605 may form a URI table.

In various embodiments, an instance of a URI table entry 605 may also record the URI associated with each data fetch operation sent to the datastore 115 by the client application 135. Each request sent to the datastore 115 by the client application 135 may be recorded in an instance of the URI table entry 605.

Each query corresponding to a URI table entry 605 may return any number of objects. Each returned object may be associated with an instance of a record table entry 610. A record table entry 610 that represents a query result may include an associated URI ID that links the record table entry 610 to an associated URI table entry 605. The record table entry 610 may also include an object type of the associated object that was returned in response to the query associated with the URI ID. The record table entry 610 may also include a primary key, which is a designation that uniquely identifies the object associated with the instance of the record table entry 610. The primary key may uniquely link the record table entry 610 to an object. The record table entry 610 may also include a sequence number that indicates the order that the object associated with the record table entry 610 appeared in the query results. Using this sequence number, a subsequent query having a URI that matches the URI referred to in the record table entry 610 may return the objects in the same order as originally returned.

An object 615 may be associated with one or more record table entries 610. An object 615 may also be associated with one or more URL table entries 605, e.g., via one or more record table entries 610 associated with the object 615. The object 615 may include various data fields according to a type of the object 615. The object 615 may specify an object type of the object. As an example, the object 615 may be of a type Opportunity, Contact, etc. The object 615 may specify a primary key that uniquely identifies the object in the full canonical representation of the object 615 in the datastore 115. The object 615 may specify an object ID that identifies the object in the local object-agnostic data structure 600 as stored in the client device 130. The object 615 may include data associated with the object 615 according to the object type. As an example, the data stored with the object 615 may be in a JSON format. The object 615 may specify a timestamp of when the object 615 was last updated and/or when the object was last accessed. The object 615 may specify an electronic tag that specifies a version number of the object 615. The client application 135 may use the ETAG to determine if the object 615 has changed. The object 615 may specify whether the object 615 includes a canonical or complete representation of the object as stored in the datastore 115 at the time the object was retrieved from the datastore 115. The object 615 may indicate whether the client application 135 has marked the object 615 to be deleted. When the object 615 has been marked to be deleted, it may be deleted from both the locally stored object-agnostic data structure 600 and the datastore 115 during a synchronization operation when the locally stored object-agnostic data structure 600 is synchronized with the datastore 115. The object 615 may also include transient data, which is data that the client application 135 locally stores with the object 615 that is not intended to be synchronized with the full canonical representation of the object 615 in the datastore 115. The transient data may include locally generated data based on data stored in the version of the object 615 in the datastore 115. The transient data itself may not be stored in the version of the object 615 in the datastore 115. As an example, the transient data may include calculations performed by the client application 135 pertaining to the object 615 that are intended for local use only. As another example, the transient data may include a shorthand name field used by a user of the client application 135 but not to be stored in the datastore 115. The transient data may be stored in JSON format. The format and content of the transient data may be defined by the client application 135. The server 110 and/or the datastore 115 may have no information regarding or mechanisms for working with the transient data stored in the object 615 as part of the object-agnostic data structure 600.

A list of values element 620 may include a URI ID that identifies the URI table entry 605 with which the list of values element 620 is associated. The list of values element 620 may also include a timestamp indicating a time that the associated URI was created and/or used to perform a query. The list of values element 620 may also include data corresponding to the associated URI. The data may be stored in JSON format. The data may include a payload provided with the URI, e.g., data associated with a URL transmitted by the client application 135 to the server 110 to request that a query be performed on the datastore 115. Each URI table entry 605 may optionally be associated with a list of values element 620.

An attachment element 625 may include a URI ID that identifies the URI table entry 605 with which the attachment element 625 is associated. The attachment element 625 may also include a timestamp indicating a time that the associated URI was created and/or used to perform a query. The attachment element 625 may also include a document ID for identification and location of a document corresponding to the associated URI. The document may be considered as an attachment to the URI table entry 605, incorporated by reference, but not directly stored within the object-agnostic data structure 600. The document referenced by the document ID may be associated with a URL transmitted by the client application 135 to the server 110 to request that a query be performed on the datastore 115. Each URI table entry 605 may optionally be associated with an attachment element 625.

An object indices table 630 may include a primary key to uniquely identify the object 615 associated with the object indices table 630, and any number of object indexes associated with the associated object 615. The object indices table 630 may include index values used by the client application 135 when processing the object 615 according to the object 615's stored data. The object indices table 630 may be created by the client application 135 at runtime based on queries defined in the client application 135's executable code. The object indices table 630 may facilitate faster processing of the object 615 by locally storing indexes to data locations within the object 615's stored data. All fields that can be used in queries may be defined in metadata, e.g., in the object type definition 230 and/or the metadata modules 235. Each of these fields may have an assigned index so that all the data elements of a JSON representation of the object 615 may not need to be processed in order to get at all the data elements directly.

The object-agnostic data structure 600 may facilitate efficient queries and processing of locally stored objects by the client application 135. When the client application 135 is ready to process a new URI for a query, the client application 135 may search the URI table that includes the URI table entries 605 to find a previously processed URI that matches the new URI. If the client application 135 finds a match, the client application 135 may search the records table that includes the records table entries 610 to access all the record table entries 610 corresponding to objects 615 that were returned by the prior query that matches the new URI. When the client application 135 finds a URI match, the client application 135 can use the URI ID of the matched URI to access all stored information pertaining to the matched URI and the objects 615 that were returned from the query of the matched URI.

As an example, the client application 135 may submit multiple queries to the server 110 for obtaining multiple respective result sets. A first query, submitted by the client application 135, may correspond to a list of departments in a company. The first result set, received by the client application 135, may include objects 615 of type Department. The objects 615 of type Department may be stored in an instance of the object-agnostic data structure 600 on the client device 130. The stored object 615 may be associated with a URI table entry 605 corresponding to the first query and one record table entry 610 indicating an object type Department and a primary key for each return object 615 of type Department. The sequence of objects 615 of type Department in the first result set may be indicated by the corresponding record table entries 610. A second query, submitted by the client application 135, may correspond to a list of employees in the Information Technology (IT) department of the company. The second result set, received by the client application 135, may include objects 615 of type Employee. The objects 615 of type Employee may be stored in the same instance of the object-agnostic data structure 600 as the objects 615 of type Department. Each object 615 of type Employee may be associated with a unique record table entry 610 indicating the primary key for the respective object 615, the object type Employee, and the respective sequence number for the object 615 in the second result set.

In an embodiment, a prior version of an object 615 received in a last-received result set may already be stored in the instance of the object-agnostic data structure 600 maintained by the client application 135. An identifier generated by the server 110 and stored with the object 615 in the ETAG field may be used by the client application 135 to determine that a newer version of a previously received object 615 has been received. The latest version of the object 615 in the last-received result set may be stored in the local instance of the object-agnostic data structure 600 to replace the prior version of the object 615. Accordingly, different result sets corresponding to different queries may update versions of a same object 615 stored in the local instance of the object-agnostic data structure 600 by the client application 135.

In an embodiment, the client application 135 builds a local instance of the object-agnostic data structure 600 (for example, in a cache or other memory of the client device 130) with objects 615 of different types corresponding to respective result sets. The local instance of the object-agnostic data structure 600 built by the client application 135 may not necessarily include complete data sets for an object type, as stored at the server 110 in the datastore 115. For example, the local instance of the object-agnostic data structure 600 may include objects 615 of type Employee for all employees in the IT department. However, the local instance of the object-agnostic data structure 600 may not necessarily include objects 615 of type Employee for employees in all other departments.

The client application 135 may generate a result set identifier for each result set received from the server 110. The generated result set identifier may be stored as the URI ID in the URI table entry 605 corresponding to the query associated with the result set. The result set identifier may be generated using any methodology. For example, the result set identifier may be generated using a hash of the result set. The result set identifier may be generated in a chronological order, incrementing a result set identifier for a last result set to determine a result set identifier for the current result set. The client application 135 may store (a) a mapping between the result set identifier (e.g., URI ID in the record table entries 610 associated with the result set) and the result set and (b) a mapping between the result set identifier and the associated query (e.g., URI ID in the URI table entry 605 associated with the query). Storing the mapping between the result set identifier and a result set may include storing the result set identifier in association with each object 615 corresponding to the result set. For example, the result set identifier may be stored in the corresponding record table entry 610 that includes both the URI ID field associated with the result set identifier and the primary key field associated with the corresponding object 615. As an example, a record table entry 610 may be stored for each object 615 with (a) an object identifier (e.g., primary key) corresponding uniquely to the object 615. The record table entry 610 may also be stored for each object 615 with (b) a result set identifier (e.g., URI ID) corresponding to the result set associated with the object 615. An object identifier may include a primary object identifier generated by the server 110 to identify the object 615 or a local object identifier generated by the client application 135 to identify the object 615. If an object 615 is associated with multiple result sets, multiple record table entries 610 may be stored for the object 615, each one including a result set identifier associated with the corresponding result set. Any number of result set identifiers may also be stored, by the client application 135, within the locally cached copy of the object 615 itself (instead of or in addition to separate record table entries 610) mapping result set identifiers to object identifiers. The mapping of the result set identifiers to object identifiers may be stored within the transient data portion of the object 615.

Figure 7:
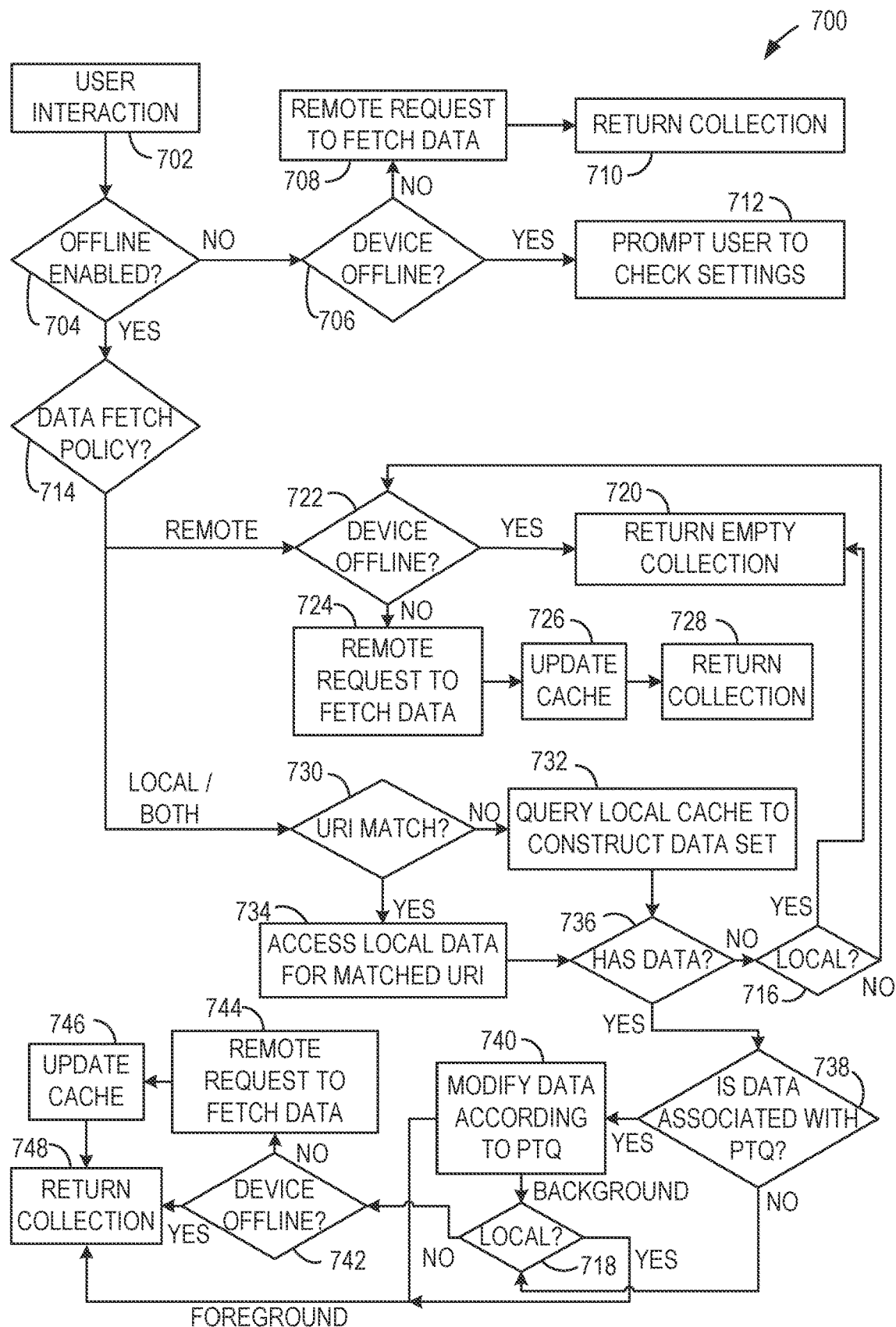
FIG. 7 shows a block diagram that illustrates an example set of operations for providing partial search results in a client application without waiting for completion of a search of a complete set of objects stored at a server in accordance with one or more embodiments.

FIG. 7 shows a block diagram that illustrates an example set of operations 700 for providing partial search results in a client application 135 without waiting for completion of a search of a complete set of objects stored at a server 110 in accordance with one or more embodiments. The operations recited in FIG. 7 may be altered, re-arranged, deleted, or otherwise modified. Accordingly, the order or combination of operations illustrated in FIG. 7 should not be construed as limiting the scope of any of the claims.

The client application 135 may interact with a user via a user interface in a user interaction operation 702. The client application 135 may interact with the user via user interface elements of the client device 130. The user interface and specific functionality of the user interaction operation 702 may be defined according to a metadata of a data control model 200 as described elsewhere herein. The user interaction may include a request to access a data object or perform a query on a database of data objects, e.g., the object 615 of the object-agnostic data structure 600 as discussed above. The client application 135 may create a URI to represent the query or request. The client application 135 may store the URI formed to represent the query or request on the client device 130 for access and retrieval, e.g., in a URI table entry 605 of the object-agnostic data structure 600. Every user interaction may be associated with a specific URI.

In an operation 704, the client application 135 may determine whether the client application 135 has an offline mode enabled. A user may enable the offline mode of the client application 135 to permit the client application 135 to provide functionality that would ordinarily require access to the server 110 and/or the datastore 115 when the client device 130 is offline. The client application 135 may be considered offline when the server 110 and/or the datastore 115 are not presently accessible to the client application 135 and/or client device 130. For example, the client application 135 may be considered offline when the network 120 is down or there is otherwise no active network connection via the network 120 between the client application 135 and the datastore 115. When the client application 135 does not have an offline mode enabled, and the client application 135 is offline, the client application 135 may be unable to provide functionality that requires access to the server 110 and/or the datastore 115. When the client application 135 determines that offline mode is not enabled, operation 706 may be performed. When the client application 135 determines that offline mode is enabled, operation 706 may be performed.

In an operation 706, the client application 135 may determine whether the client application 135 and/or the client device 130 is offline. For example, the client application 135 may determine whether the client application 135 and/or the client device 130 are presently able to access the server 110 and/or the datastore 115, e.g., via the network 120.

In an operation 712, when the client application 135 determines that the client application 135 and/or the client device 130 are offline, the client application 135 may not have access to data stored at the datastore 115. The client application 135 may therefore notify the user of the offline status and that the client application 135 is not presently able to perform functions that require an online status. The client application 135 may prompt the user to check the application settings. For example, the client application 135 may request the user to check the offline enablement settings for the client application 135.

In an operation 708, when the client application 135 determines that the client application 135 and/or the client device 130 are not offline, the client application 135 may submit a request to the server 110 to fetch data from the datastore 115 according to the user interaction in operation 702. The remote request to fetch data may be transmitted as a URI, e.g., a URL, from the client device 130 to the server 110. The URI may include an HTTP request, e.g., a REST request.

In an operation 710, the server 110 may return a collection of objects from the datastore 115 in response to the request to fetch data to the client device 130 and/or the client application 135. The collection of objects may be received by the client application 135 as a response to a query that the client application 135 sent to the server 110 in the operation 708. The client application 135 may store the received collection of objects in an object-agnostic data structure, e.g., the object-agnostic data structure 600, at the client device 130. The client application 135 may present the received collection of objects to the user, e.g., via a user interface configured according to the data control model 200 discussed elsewhere herein.

In an operation 714, after the client application 135 determines that an offline mode is enabled in operation 704, the client application 135 may determine a present data fetch policy that the client application 135 is operating under. The data fetch policy may include LOCAL, in which only local data is accessed by the client application 135, e.g., data stored in the client device 130, and not data stored remotely, e.g., in the datastore 115. The data fetch policy may include REMOTE, in which only data stored remotely, e.g., in the datastore 115, is accessed by the client application 135. In the REMOTE mode, the client application 135 may locally store the data accessed remotely, but may not access local copies of data previously downloaded from the datastore 115 in response to subsequent queries or requests to fetch data. The data fetch policy may also include BOTH, in which the client application 135 may access local copies of data previously downloaded from the datastore 115 in response to subsequent queries or requests to fetch data, as well as data stored remotely in the datastore 115 when available. When operating under the BOTH data fetch policy, the client application 135 may access the local data first, when available, and subsequently access data stored remotely using the same fetch request or query applied to the remote datastore 115. The client application 135 may use the data accessed remotely to update the data accessed locally. The data stored locally may be updated with the data accessed remotely, and data presented to the user via a user interface on the client device 130 may be updated or refreshed with data received from the remote fetch or query operation.

When the data fetch policy is determined to be REMOTE in operation 714, the client application 135 may perform operation 722 to determine whether the status of the client application 135 and/or the client device 130 is presently offline. When the status is determined to be offline, the client application 135 will not query a local cache in lieu of the remote datastore 115 because the present data fetch policy is REMOTE. Therefore, after the status is determined to be offline, in operation 720, the client application 135 may return an empty result in response to the query or data fetch requested in the user interaction operation 702.

When the status is determined to not be offline in operation 722, the client application 135 may send a remote request to fetch data from the datastore 115 in operation 724. The remote request to fetch data may include a URI, e.g., a URL, that identifies the server 110 hosting the datastore 115. The remote request may include an HTTP request, e.g., a REST request. The remote request may specify terms for executing a query on the datastore 115. The client application 135 may receive a response from the server 110 including any data objects that match the terms of the remote request to fetch data from the datastore 115. In an operation 726, the client application 135 may store the data objects received by the client application 135 in response to the remote request to fetch data. The client application 135 may update the local object cache with the received data objects. The client application 135 may update the values of specific objects 615 in the object-agnostic data structure 600 according to values of the corresponding data objects received from the datastore 115. The client application 135 may create new instances of objects 615 in the object-agnostic data structure 600 that correspond to the data objects received from the datastore 115 when there are not previously existing instances of the objects 615 that match the data objects received from the datastore 115. After the client application 135 updates the local cache with the data objects received from the datastore 115, the client application 135 may return the collection of data from the local cache query in operation 728. The collection of data may be returned to the user via the user interface of the client application 135 and/or the client device 130.

When the data fetch policy is determined to be LOCAL or BOTH (e.g., local data fetch only, or both local data fetch and remote data fetch) in operation 714, the client application 135 may perform operation 730. In operation 730, the client application 135 may determine whether the URI corresponding to the current query or data fetch operation matches a previous URI locally stored in the object-agnostic data structure 600.

When a match is found in operation 730, the client application 135 may perform an operation 734. In operation 734, the client application 135 may access the locally stored data associated with the matched URI in the object-agnostic data structure 600. For example, the client application 135 may access locally stored objects 615 linked to record table entries 610 associated with a matched URI table entry 605. In an embodiment, the client application 135 may repeat the query associated with the matched URI table entry 605 on the local object cache and update the local instance of the object-agnostic data structure 600 associated with the URI table entry 605 based on the new local query. In an embodiment, the client application 135 may return the collection of objects 615 mapped to the matched URI table entry 605 as the result set for the current local query.

When a match is not found in operation 730, the client application 135 may perform an operation 732. In operation 732, the client application 135 may query a local cache according to the user interaction operation 702. The client application 135 may perform the query associated with the URI generated in response to the user interaction operation 702 on the local object cache. The client application 135 may perform the query on the object indices table 630. The client application 135 may construct a corresponding data structure to store the results of the local query as a data set in the local instance of the object-agnostic data structure 600. The local cache and the data set may be stored in the client device 130, local to the client application 135.

For example, the client application 135 may create a URI table entry 605 including the URI generated in response to the user interaction operation 702. The client application 135 may also store any data and links to documents associated with the URI table entry 605 in one or more list of values elements 620 and attachment elements 625. For each locally cached object returned by the local query, a record table entry 610 may be created to identify the associated URI table entry 605 and the associated object 615. The object 615 may be a same data structure instance as stored in the local object cache that was queried.

Continuing the above example related to Department type objects and Employee type objects, a query may request all employees in a company. Accordingly, the type of objects 615 requested by the query may be Employee. The query may be for all objects 615 of the type Employee. However, the result sets locally stored by the client application 135 in the local instance of the object-agnostic data structure 600, when the query is received, may include (a) a list of all departments, and (b) a list of all employees in the IT department. Accordingly, while the result sets locally stored by the client application 135 identify some employees, the local result sets do not identify all the employees in the company. Therefore, when the client application identifies all objects 615 in the local instance of the object-agnostic data structure 600 of type Employee, only employees from the IT department that correspond to a previously received result set may be included in the current result set. The client application 135 may thus present the employees from the IT department as a partial result set in response to the request for execution of the query for all employees of the company.

If the query includes an additional parameter, the client application 135 may execute the query including the additional parameter to obtain the corresponding result set. As an example, the query may request all employees of the company with a first name "Mike". The client application 135 may execute the query on the locally stored objects 615 to identify objects 615 that (a) are of the type Employee and (b) have a first name "Mike". The client application 135 may present the results of the query as the result set. The result set may only be a partial response to the query as the result set may only include employees in the IT department with the first name, "Mike", and not include all employees with the first name "Mike".

The objects 615 of type Employee and of type Department may be stored in a same local instance of the object-agnostic data structure 600. A query for employees of the company with a first name "Mike" may be executed on the local instance of the object-agnostic data structure 600. Execution of the query on the local instance of the object-agnostic data structure 600 may include selection of any object 615 with a value of Employee for the type field and a value of "Mike" for the first name field.

In an operation 736, the client application 135 may determine whether any data was returned from the local query. For example, the client application 135 may determine whether the URI table entry 605 associated with the current query is associated with any record table entries 610. If not, then the client application 135 may proceed to determine whether the data fetch policy is LOCAL in an operation 716. If the data fetch policy is determined to be LOCAL, since no data was returned, the client application 135 may return an empty result in operation 720. If the data fetch policy is not determined to be LOCAL, then the data fetch policy is BOTH, and the client application 135 may perform a remote fetch operation beginning with operation 722 as discussed above.

If data was returned from the local query, the client application 135 may proceed to update the local object cache and the object-agnostic data structure 600 with results from a remote query, e.g., of the datastore 115. Continuing the example, the client application 135 may cause the query to be executed on the remote datastore 115 to identify objects 615 that (a) are of the type Employee and (b) have a first name "Mike". The client application 135 may receive the results of the query from the server 110 as the complete result set. The result set may be a complete response to the query as the result set may include all employees in all departments with the first name, "Mike". The previously obtained local result set may be updated with the complete result set obtained from the datastore 115.

The client application 135 may also proceed to update the object-agnostic data structure 600 according to any pending transactions involving objects locally stored on the client device 130 that have not yet been synchronized with the datastore 115.

Responsive to the client application 135 determining that data was returned from the local query in operation 736, the client application 135 may perform an operation 738. In the operation 738, the client application 135 may determine whether any returned data, e.g., locally stored objects 615 associated with the URI corresponding to the local query, are associated with a pending transaction queue (PTQ). The PTQ may store transactions or operations involving objects 615 that have been performed locally by the client application 135 but not yet synchronized with the remote datastore 115. Further details of the PTQ are discussed elsewhere herein.

When at least some of the returned data from the local query, e.g., objects 615 associated with the URI corresponding to the local query, is associated with the PTQ, the returned data may be updated with associated transactions in the PTQ in an operation 740. Exemplary details of this operation are discussed elsewhere herein. After being updated, the updated objects 615 may correspond to what the corresponding objects in the datastore 115 would be after the transactions in the PTQ are synchronized with the datastore 115. In some embodiments, the updated objects 615 may be updated copies of the originally returned objects 615 and the original non-updated objects 615 may also continue to be locally stored. In some embodiments, the locally stored objects 615 are directly updated in operation 740. After completion of the operation 740, the collection of updated data may be returned in the operation 748 in a foreground operation. The collection of updated data may be returned to the user via the user interface of the client application 135 and/or the client device 130.

Simultaneously with or subsequent to the return of the collection in operation 748, e.g., in a background operation, the client application 135 may update the local search results with search results fetched from the remote server. In the background operation, the client application 135 may proceed to determine whether the data fetch policy is LOCAL in an operation 718. If the data fetch policy is determined to be LOCAL, the client application 135 may end the background operation or merge the background operation with the foreground operation 748 of returning the results. If the data fetch policy is not determined to be LOCAL, then the data fetch policy is BOTH, and the client application 135 may proceed with the background operation and determine whether the client application 135 and/or the client device 130 are in an offline mode in an operation 742. Responsive to the client application 135 and/or the client device 130 being determined to not be in an offline mode, a remote request to fetch data may be performed in operation 744, followed by updating of the local cache in operation 746. The locally returned collection of data may be updated or refreshed by the updated cache in the operation 748. The client application 135 may also report to a user that there are updated results available, and/or present the updated results according to the updated cache in operation 748 following the background operation of updating the local cache with remotely fetched data. Operations 744, 746, and 748 may be performed in a manner similar to that of operations 724, 726, and 728 discussed above.

When no returned data from the local query, e.g., objects 615 associated with the URI corresponding to the local query, is associated with the PTQ, the client application 135 may determine whether the data fetch policy is LOCAL in the operation 718 and proceed accordingly as discussed above.

In some embodiments, the PTQ may also be synchronized with the datastore 115 prior to performing the remote request to fetch data in operation 744. In some embodiments, an operation similar to operation 740 may also be performed prior to performing the local query so that any objects created in the PTQ are included in the query results. In some embodiments, the PTQ may be synchronized with the remote datastore 115 prior to performing a remote request to fetch data in operation 724. In some embodiments, locally cached data, e.g., objects 615 in the object-agnostic data structure 600, may be refreshed periodically by fetching versions of the objects 615 from the datastore 115 in the background to update the locally cached objects 615.

4.3 Optimizing a Pending Transaction Queue

Users of the client application 135 in the client-server computing system 100 may desire to access and modify data stored on the server 110 when the server 110 is not accessible via the network 120. In various embodiments, the client-server computing system 100 provides offline write access to facilitate the client application 135 to access and modify data stored on the datastore 115 when the server 110 is not accessible from the client device 130. In various embodiments, the client application 135 may interface the object-agnostic data structure 600 with a pending transaction queue (PTQ). The interfacing of the object-agnostic data structure 600 with the PTQ may facilitate the client application 135 accessing and modifying data stored in the datastore 115 when the client application 135 does not have current access to the datastore 115. The combination of the PTQ with the object-agnostic data structure 600 may provide the user of the client application 135 with a logically consistent view of locally stored data in the local instance of the object-agnostic data structure 600. The PTQ may facilitate the client application 135 to modify data objects in the datastore 115 in an offline mode when the corresponding local objects 615 are only partial representations of the data objects. The client application 135 may present the locally stored data consistent with local changes made while the client application 135 is not communicatively coupled with the datastore 115. The client application 135 may also maintain consistency between the locally stored data and the datastore 115 after the local changes are made to the local data while the client application 135 is not communicatively coupled with the datastore 115.

Figure 8:
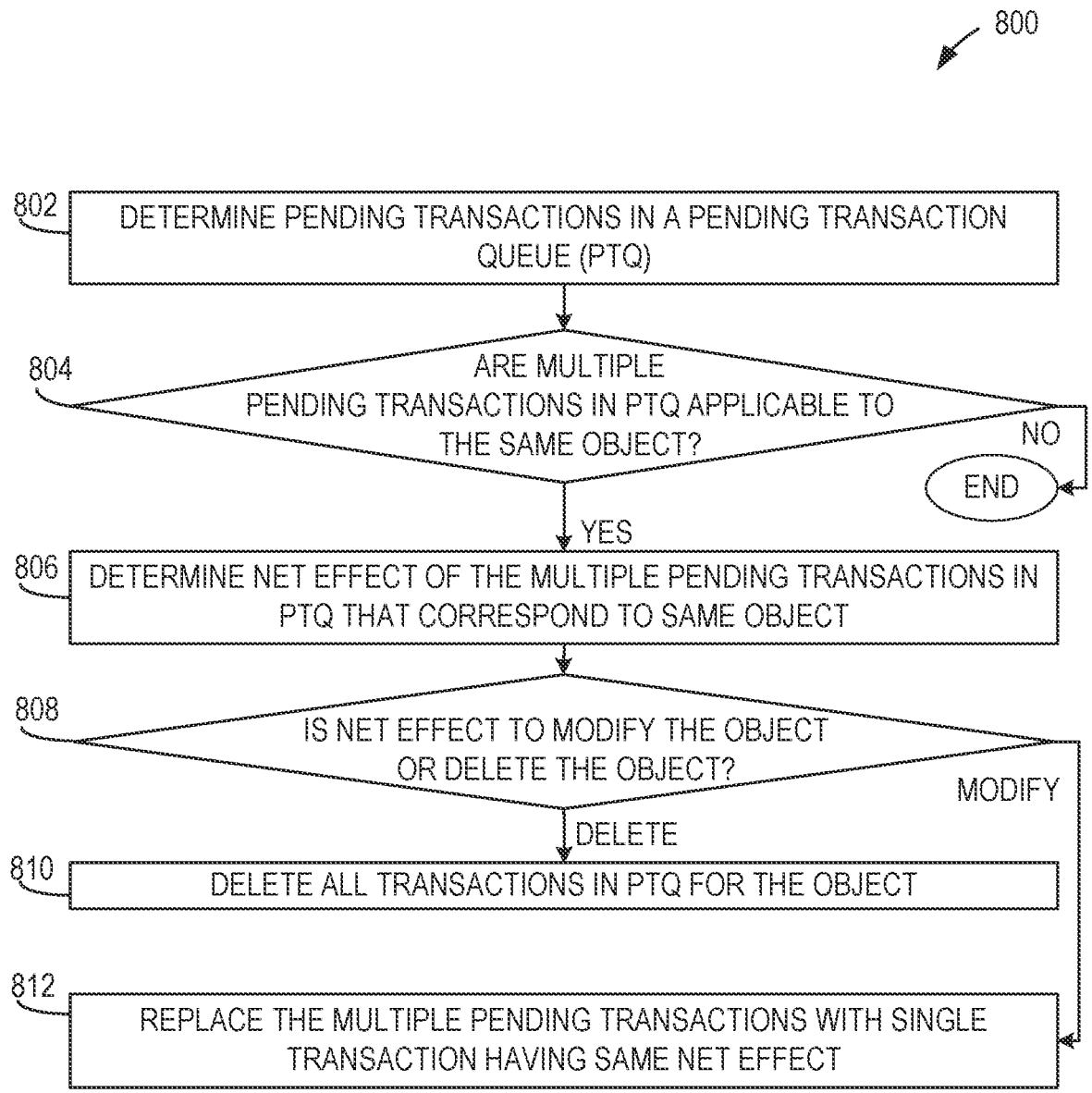
FIG. 8 shows a block diagram that illustrates an example set of operations for optimizing a local pending transaction queue to be synchronized with a server in accordance with one or more embodiments.

FIG. 8 shows a block diagram that illustrates an example set of operations 800 for optimizing a local pending transaction queue (PTQ) to be synchronized with a server in accordance with one or more embodiments. The operations recited in FIG. 8 may be altered, re-arranged, deleted, or otherwise modified. Accordingly, the order or combination of operations illustrated in FIG. 8 should not be construed as limiting the scope of any of the claims.

The PTQ may be maintained by the client application 135 on the client device 130. The PTQ may queue transactions on objects 615 to be synchronized with the datastore 115 on the server 110 at a later time. For example, the client application 135 may queue transactions in the PTQ when the client application 135 is in an offline mode, and then synchronize the PTQ with the datastore 115 on the server 110 when the client application 135 is in an online mode. The client application 135 may maintain individual transactions in the PTQ that can be tracked, applied to data objects, canceled, or mitigated separately in the order recorded. The transactions may include creation, deletion, and modification of objects 615.

The client application 135 may maintain the PTQ separately from the objects 615 received from the datastore 115. Separate maintenance of the local cache of objects 615 and the PTQ facilitates the client application 135 to optimize synchronization with the datastore 115 and present objects 615 that are consistent with a user's submitted transactions. When the client application 135, in an offline mode, receives a request to present an object 615 prior to the synchronization of any pending transactions applicable to the object 615 with the datastore 115, the client application 135 may present a modified copy of the object 615. The client application 135 may generate a copy of the object 615 in the local cache of objects 615. The client application 135 may then modify the copy of the object 615 by executing the pending transactions applicable to the object 615 on the copy of the object 615. The current object 615 in the local cache of objects 615 may not be modified while the pending transaction remains in the PTQ.

In an operation 802, the client application 135 may determine pending transactions that are queued in a PTQ. The pending transactions may be transactions requested by a user of the client application 135 to be performed on one or more objects 615 locally cached by the client application 135. There may be pending transactions for any number and different types of objects 615 queued in the PTQ at any given time.

A pending transaction to create a new object 615 may include a type of the new object 615 and data to be included in the new object 615. The pending transaction may include a timestamp indicating a time at which the request to create the object 615 was received. The pending transaction may include a local identifier, e.g., object ID, for reference by the client application 135, for the object 615 to be created.

A pending transaction to modify an object 615 may identify a modified data value to be included in the object 615. The pending transaction may include a timestamp indicating a time at which the request to modify the object 615 was received. The pending transaction may include a local identifier, e.g., object ID, for reference by the client application 135, for the object 615 to be modified. In an example, a pending transaction to modify an object 615 may indicate a new phone number for a user profile object. A pending transaction to modify an object 615 may identify an operation to be applied to a current value of the object 615. For example, the pending transaction may include "+10" to be applied to a current number of widgets to be ordered for a customer.

A pending transaction to delete an object 615 may identify the object 615 to be deleted. The pending transaction may include a timestamp indicating a time at which the request to delete the object 615 was received. The pending transaction may include a local identifier, e.g., object ID, for reference by the client application 135, for the object 615 to be deleted.

In an operation 804, the PTQ may be checked to determine if multiple pending transactions in the PTQ correspond to or are applicable to the same object 615. Object identifiers indicated in each pending transaction may be compared to determine if the same object identifier is indicated for two or more pending transactions. If two or more pending transactions are not applicable to the same object, then no optimization of the PTQ may be performed and the operations 800 may end.

If two or more pending transactions are determined to be applicable to a same object 615, then in operation 806, the client application 135 may determine a net effect of the multiple pending transactions in the PTQ applicable to the same object 615. The multiple pending transactions may be applied to a copy of the object 615 in an order based on the timestamp of the pending transactions to determine the net effect of the multiple pending transactions. For example, a first pending transaction applicable to an object 615 may include "+10" to be applied to a current number of widgets to be ordered for a customer. A second pending transaction applicable to the same object 615 may include "+20" to be applied to the current number of widgets to be ordered for the customer. The net effect of the two pending transactions applicable to the same object 615 may be determined to be applying "+30" to the current number of widgets to be ordered for the customer. As another example, a first pending transaction applicable to an object 615 may indicate a new phone number for a user profile object. A second pending transaction applicable to the same object 615 may be to delete the object 615. The net effect of the two pending transactions applicable to the same object 615 may be to delete the object 615.

In an operation 808, the client application 135 may determine whether the net effect of the multiple transactions applicable to the same object 615 is to modify the object 615 or to delete the object 615. The determination may be made based upon the net effect determined in operation 806.

If the net effect is determined to be to delete the object 615, then in an operation 810, the client application 135 may delete all transactions in the PTQ applicable to the object. In an embodiment, when the object 615 to be deleted was downloaded from the datastore 115, an object deletion transaction for the object 615 may be left in the PTQ or added to the PTQ in place of the deleted transactions. In an embodiment, when the object 615 to be deleted was created by the client application 135 but not yet synchronized with the datastore 115, then all transactions in the PTQ for the object 615 to be deleted may be deleted.

If the net effect is determined to be to modify the object 615, then in an operation 812, the client application 135 may replace all the pending transactions in the PTQ applicable to the object 615 with a single transaction that has the same net effect. For example, two pending transactions for a same object 615 may include "+10" and "+20" to be applied to a current number of widgets to be ordered for a same customer, respectively. The two pending transactions may be replaced by a single transaction that includes "+30" to be applied to a current number of widgets to be ordered for the customer. As another example, a first pending transaction may be an update to a customer's phone number in a customer profile object 615, and a second pending transaction may an update to the customer's address in the same customer profile object 615. The first pending transaction and the second pending transaction may be combined to form a single pending transaction to the customer profile object 615 that includes both the new phone number and the new address for the customer. The single pending transaction replaces both the first pending transaction and the second pending transaction in the PTQ.

In an embodiment, the client application 135 may execute the operations 800 on the PTQ prior the PTQ is about to be synchronized with the datastore 115 at the server 110 in order to optimize the PTQ prior to the synchronization. By optimizing the PTQ prior to the synchronization, data transferred between the client device 130 and the server 110 may be reduced, thereby improving responsiveness of the client application 135 and the datastore 115.

Figure 9:
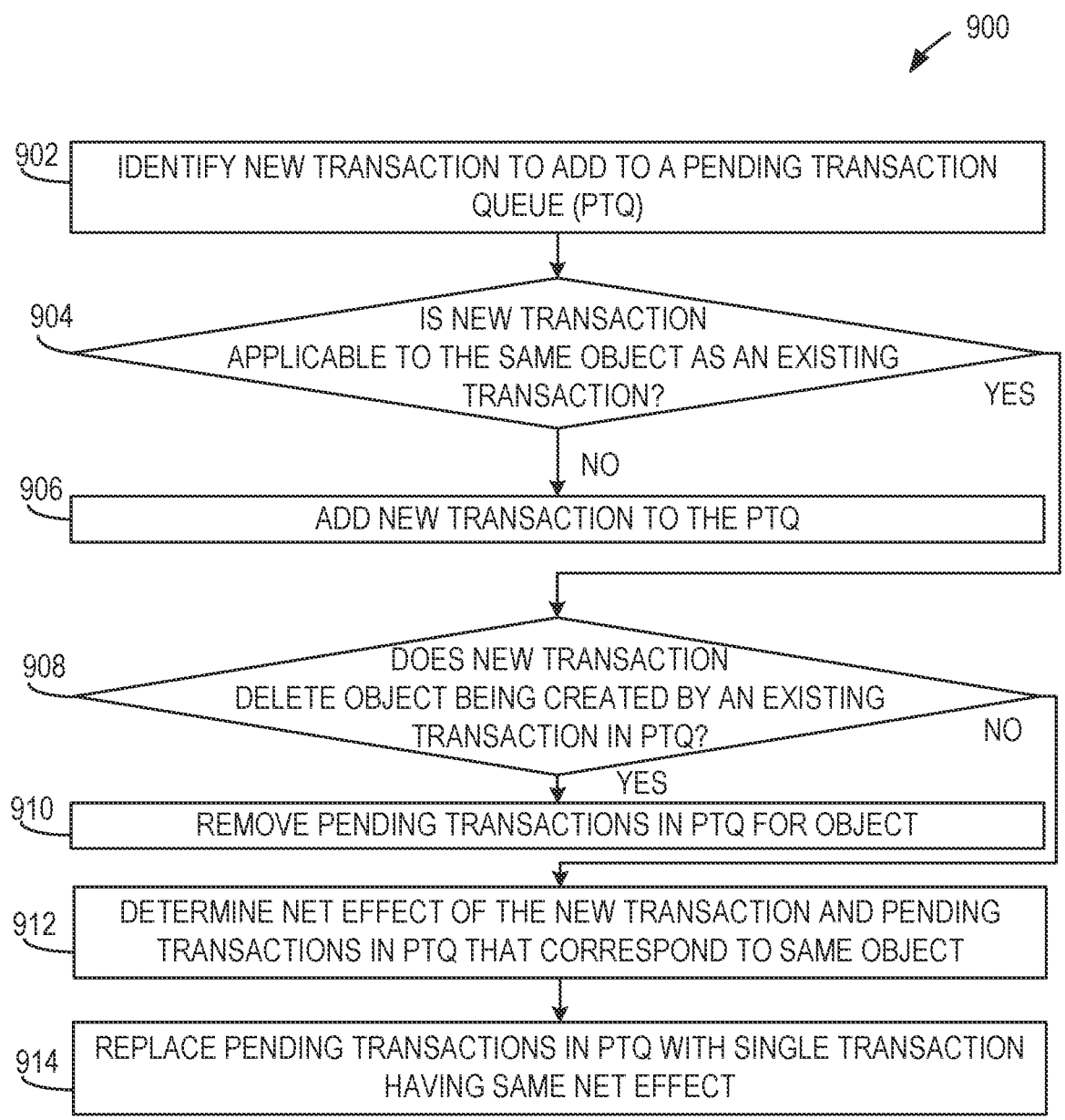
FIG. 9 shows a block diagram that illustrates an example set of operations for optimally adding a new transaction to a local pending transaction queue to be synchronized with a server in accordance with one or more embodiments.

FIG. 9 shows a block diagram that illustrates an example set of operations 900 for optimally adding a new transaction to a local pending transaction queue (PTQ) to be synchronized with a server 110 in accordance with one or more embodiments. The operations recited in FIG. 9 may be altered, re-arranged, deleted, or otherwise modified. Accordingly, the order or combination of operations illustrated in FIG. 9 should not be construed as limiting the scope of any of the claims. In an embodiment, the client application 135 may execute the operations 900 on the PTQ each time a new transaction is added to the PTQ in order to maintain the PTQ in an optimized state. By maintaining the PTQ in an optimized state, memory utilization in the client device 130 by the client application 135 may be reduced, and latency associated with synchronizing the PTQ with the datastore 115 may be reduced.

In an operation 902, the client application 135 may identify a new transaction to add to a pending transaction queue (PTQ). The client application 135 may be in an offline mode when the new transaction is identified. The client application 135 may receive the new transaction from a user via a user interface on the client device 130. The new transaction may be to create, modify, or delete one or more objects 615 locally cached by the client application 135. As an example, a user of a client device 130 executing the client application 135 may be flying on a plane without any WiFi availability. The client application 135, executing in an offline mode, may receive a request to create or modify an object 615. The instruction to create or modify an object 615 may be received via user input, for example, on a Graphical User Interface (GUI). As an example, a salesman on a plane may meet a potential customer. The salesman may submit a request to create a new customer profile with the potential customer's name and phone number. The client application 135, executing on the salesman's cellular phone as an instance of a client device 130, may receive the request from the salesman. However, the client application 135 may be unable to submit the request to the server 110 due to the lack of an Internet connection. The request may therefore be identified as a new transaction to add to the PTQ.

In an operation 904, the client application 135 may determine whether the new transaction is applicable to the same object 615 as an existing transaction in the PTQ. Object identifiers indicated in each pending transaction may be compared with the object identifier for the object 615 that the new transaction is applicable to in order to determine if the same object identifier is indicated for both a pending transaction in the PTQ and the new transaction.

If the new transaction is not applicable to the same object 615 as any existing transaction in the PTQ, then, in an operation 906, the client application 135 may add the new transaction to the PTQ. The new transaction may include a timestamp indicating a time at which the request to perform the transaction on the corresponding object 615 was received. The new transaction may include a local identifier, e.g., object ID, for reference by the client application 135, for the object 615 to which the new transaction is to be applicable.

If the new transaction is applicable to the same object 615 as any existing transaction in the PTQ, then, in an operation 908, the client application 135 may determine whether the new transaction deletes an object 615 that a pending transaction in the PTQ creates. An object 615 that is created by a pending transaction in the PTQ may be a local object 615 that has no corresponding object in the datastore 115 because the transaction that creates the object 615 has not yet been synchronized with the datastore 115. If an object 615 to which a pending transaction in the PTQ is applicable is not created by a pending transaction in the PTQ, then the object 615 may be a server object 615 that has a corresponding object in the datastore 115. A server object 615 may have been received from the server 110 or been previously synchronized with the server 110 after being created by the client application 135.

As an example, a user of a client device 130 executing the client application 135 may be flying on a plane without any WiFi availability. The client application 135, executing in an offline mode, may receive a request to delete an object 615. The instruction to delete an object 615 may be received via user input, for example, on a Graphical User Interface (GUI). As an example, a salesman may evaluate a sales opportunity stored in the salesman's list of opportunities. The salesman may determine that there is little or no likelihood of the salesman successfully completing a sale corresponding to the sales opportunity. As a result, the salesman may submit a request to delete the sales opportunity. The client application 135, executing on the salesman's cellular phone as an instance of the client device 130, may receive the request to delete the object corresponding to the sales opportunity. If the salesman created the sales opportunity since the last time the salesman's cellular phone was connected to the server 110 via WiFi, the PTQ may include a transaction that created the sales opportunity object.

In an operation 910, if the new transaction is determined to delete an object 615 that was created by an existing pending transaction in the PTQ, all pending transactions in the PTQ for the object 615 are removed from the PTQ, including the transaction that creates the object 615. No pending transaction corresponding to the deletion of the object may be added to the PTQ. As a result of deleting all pending transactions for the object in the PTQ, the object may never be created on the server 110.

In an operation 912, if the new transaction is determined to not delete an object 615 that was created by an existing pending transaction in the PTQ, a net effect of the new transaction and all prior pending transactions for the same object 615 in the PTQ may be determined. The multiple pending transactions may be applied to a copy of the object 615 in an order based on the timestamp of the pending transactions to determine the net effect of the multiple pending transactions. For example, a pending transaction applicable to an object 615 may include "+10" to be applied to a current number of widgets to be ordered for a customer. A new pending transaction applicable to the same object 615 may include "+20" to be applied to the current number of widgets to be ordered for the customer. The net effect of the new and pending transactions applicable to the same object 615 may be determined to be applying "+30" to the current number of widgets to be ordered for the customer. As another example, a pending transaction applicable to an object 615 may indicate a new phone number for a user profile object. A new transaction applicable to the same object 615 may be to delete the object 615. The net effect of the two pending transactions applicable to the same object 615 may be to delete the object 615.

In an operation 914, the client application 135 may replace all pending transactions in the PTQ applicable to the object 615 with a single transaction that has the same net effect as the combination of pending transactions and the new transaction. For example, a pending transaction and a new transaction for a same object 615 may include "+10" and "+20" to be applied to a current number of widgets to be ordered for a same customer, respectively. The pending transaction may be replaced by a single transaction that includes "+30" to be applied to a current number of widgets to be ordered for the customer. As another example, a pending transaction may be an update to a customer's phone number in a customer profile object 615, and a new transaction may an update to the customer's address in the same customer profile object 615. The pending transaction may be replaced by a single pending transaction to the customer profile object 615 which includes both the new phone number and the new address for the customer. The single pending transaction replaces the pending transaction in the PTQ without adding the new transaction.

Figure 10:
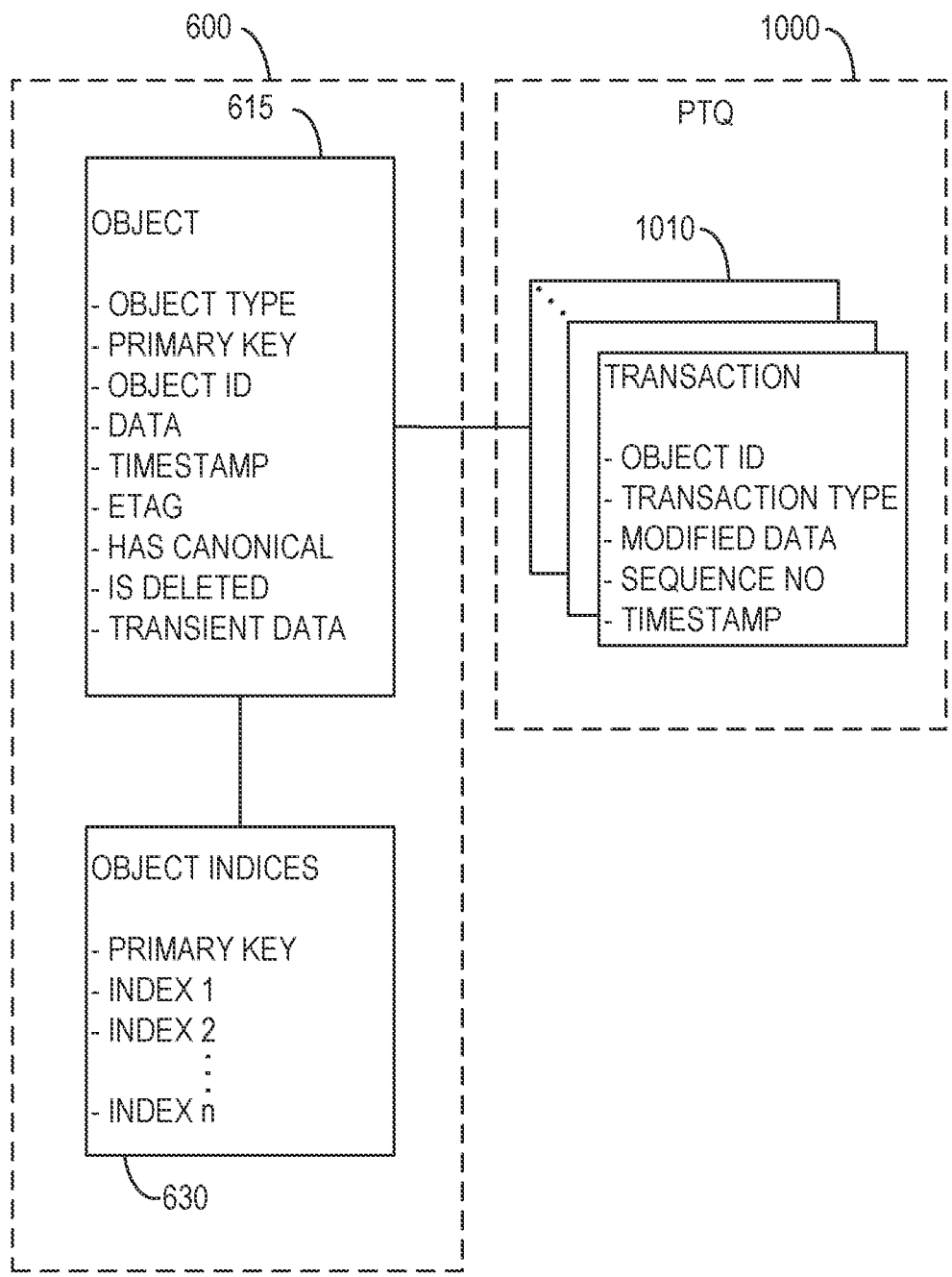
FIG. 10 shows a block diagram that illustrates components of a pending transaction queue that interfaces with an object-agnostic data model in accordance with one or more embodiments.

FIG. 10 shows a block diagram that illustrates components of a pending transaction queue (PTQ) 1000 that interfaces with an object-agnostic data structure 600 in accordance with one or more embodiments. The PTQ 1000 may be maintained by the client application 135 on the client device 130. The PTQ 1000 may queue transactions on objects 615 to be synchronized with the datastore 115 on the server 110 at a later time. The client application 135 may maintain the PTQ 1000 separately from, yet logically coupled with, the object-agnostic data structure 600 in order to provide greater operating efficiencies for local operations performed on objects 615 and synchronization of pending transactions stored in the PTQ 1000 with the datastore 115. The client application 135 may provide a consistent local view of the local cache of objects 615 while maintaining individual transactions that may be tracked, applied, canceled, or mitigated separately in the order recorded. The PTQ 1000 facilitates the objects 615 being operated on according to pending transactions before being accessed again locally when the server 110 is not readily accessible. The client application 135 may optimize the PTQ 1000 by merging multiple pending transactions that operate on a same object 615 into a single transaction before synchronizing with the datastore 115 according to their net effect. The client application 135 may optimize the PTQ 1000 by deleting multiple pending transactions that operate on a same object 615 before synchronizing with the datastore 115 if they have no net effect. The PTQ 1000 facilitates improved responsiveness by the client application 135 when a network connection to the server 110 is slow or not available.

The PTQ 1000 may include a plurality of pending transactions 1010. Each pending transaction 1010 may include a local object identifier, e.g., object ID, that identifies an object 615 that the pending transaction 1010 is applicable to. Each pending transaction 1010 may also include a specification of a transaction type, e.g., create, delete, or modify. The pending transaction 1010 may include a local identifier, e.g., object ID, for reference by the client application 135, for the object 615 to be created. The pending transaction 1010 may include a sequence number indicating the sequence of the pending transaction 1010 relative to the other pending transactions in the PTQ 1000. The pending transaction 1010 may include a timestamp indicating a time at which the request represented by the pending transaction 1010 was received.

A pending transaction to delete an object 615 may identify the object 615 to be deleted. In some embodiments, a pending transaction 1010 to create a new object 615 may include a type of the new object 615 and data to be included in the new object 615. In some embodiments, a pending transaction to create a new object 615 may include the object ID corresponding to the new local object 615 that includes the relevant information for a locally created object 615 that has not yet been synchronized with the datastore 115 at the server 110. For example, the new local object 615 may include the object type, the local object ID, data associated with the new object 615, and a timestamp indicating a time when the client application 135 received a request to create the new object 615. Since the new object 615 has not yet been synchronized with the datastore 115, the new object 615 may have a null value for the primary key field. In some embodiments, the ETAG field may be null before the new object 615 is synchronized with the datastore 115. In some embodiments, each time a local transaction modifies the object 615, the ETAG field may be updated. The has canonical field may indicate whether the new object 615 is created with all fields specified for the canonical representation of the object 615 by the corresponding object type definition 230. A pending transaction 1010 to modify an object 615 may identify a modified data value to be included in the object 615. In an example, a pending transaction to modify an object 615 may indicate a new phone number for a user profile object. A pending transaction to modify an object 615 may identify an operation to be applied to a current value of the object 615. For example, the pending transaction may include "+10" to be applied to a current number of widgets to be ordered for a customer.

The client application 135 may submit the pending transactions 1010 in the PTQ 1000 to the server 110 to be applied to the datastore 115 when the client application 135 is in an online mode. The client application 135 may be in an online mode when there is a network connection via the network 120 between the client device 130 and the server 110. In an embodiment, the client application 135 may transmit the timestamps and/or the sequence numbers of the pending transactions 1010 to the server 110. The server 110 may use the timestamps and/or the sequence numbers of the pending transactions 1010 to ensure the transactions are applied to the objects of the datastore 115 in the chronological order they were created. In an embodiment, the client application 135 may transmit the pending transactions 1010 to the server 110 in chronological order according to the timestamps and/or the sequence numbers of the pending transactions 1010. The server 110 may process the pending transactions 1010 in the chronological order received to ensure the transactions are applied to the objects of the datastore 115 in the order they were created.

Figure 11A:
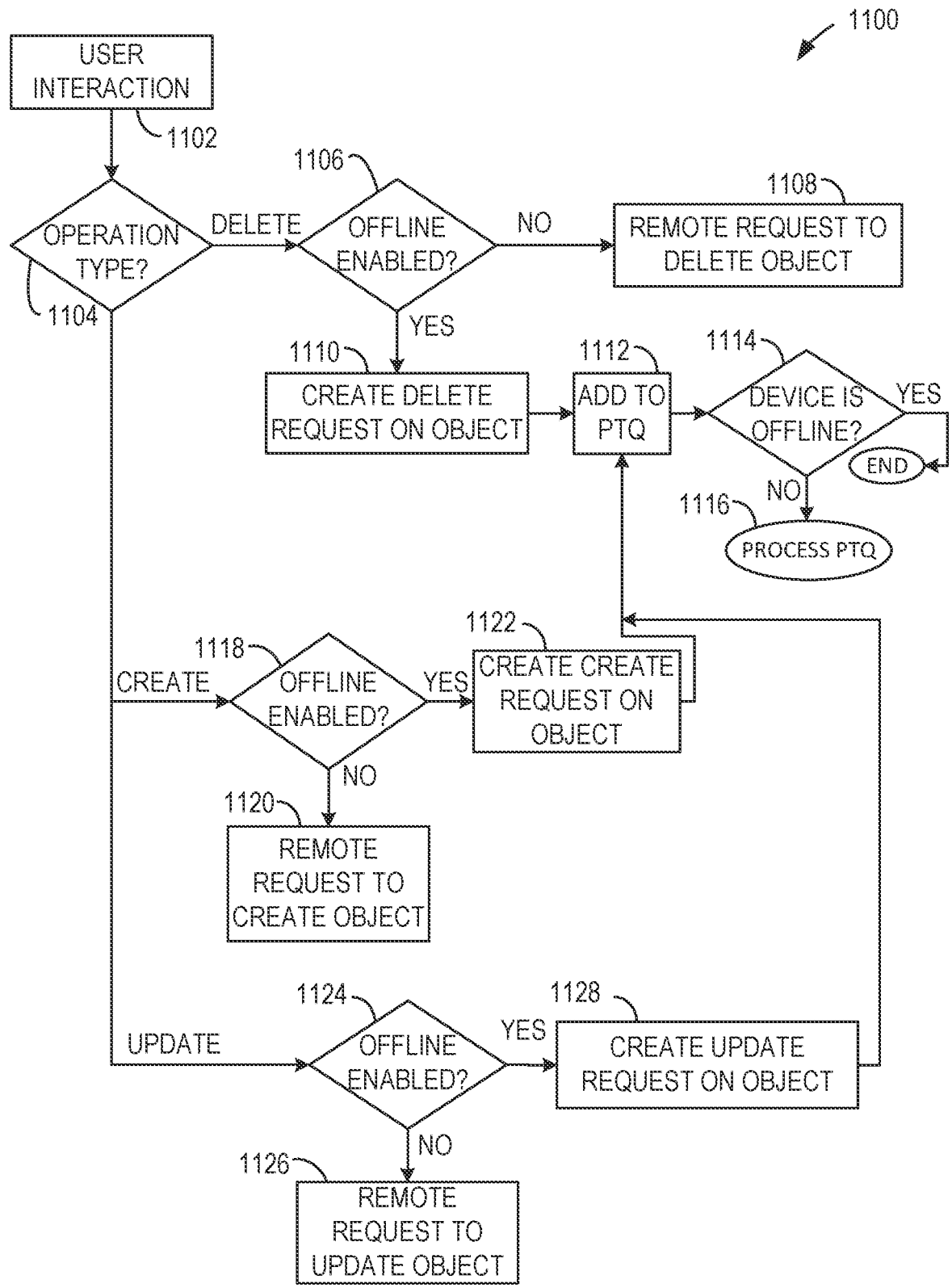
FIGS. 11A and 11B show a block diagram that illustrates an example set of operations for managing a local pending transaction queue (PTQ) to be synchronized with a datastore at a server in accordance with one or more embodiments.
Figure 11B:
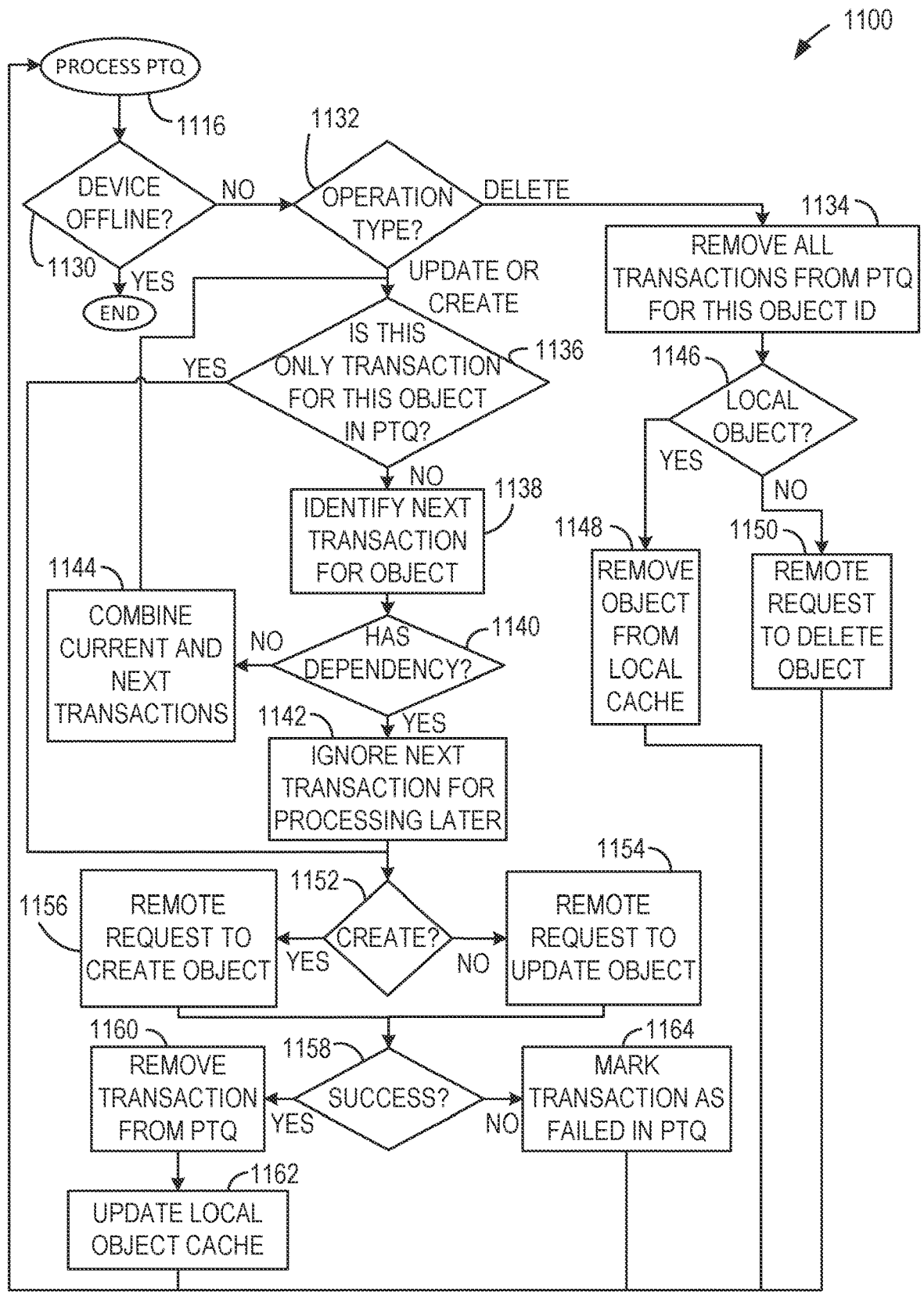

FIGS. 11A and 11B show a block diagram that illustrates an example set of operations 1100 for managing a local pending transaction queue (PTQ) 1000 to be synchronized with a datastore 115 at a server 110 in accordance with one or more embodiments. The operations recited in FIGS. 11A and 11B may be altered, re-arranged, deleted, or otherwise modified. Accordingly, the order or combination of operations illustrated in FIGS. 11A and 11B should not be construed as limiting the scope of any of the claims.

The client application 135 may interact with a user via a user interface in a user interaction operation 1102. The client application 135 may interact with the user via user interface elements of the client device 130. The user interface and specific functionality of the user interaction operation 1102 may be defined according to a metadata of a data control model 200 as described elsewhere herein. The user interaction may include a request to delete, update, or create a data object, e.g., an object 615 in the object-agnostic data structure 600 as discussed above. The client application 135 may create a URI to represent the request. The client application 135 may store the URI formed to represent the request on the client device 130 for access and retrieval, e.g., in a URI table entry 605 of the object-agnostic data structure 600. Every user interaction may be associated with a specific URI. In an operation 1104, the client application 135 may determine whether the user interaction of operation 1102 includes a request to delete, update, or create a data object.

In an operation 1106, when it is determined that the user interaction of operation 1102 includes a request to delete a data object, the client application 135 may determine whether an offline mode is enabled. A user may enable the offline mode of the client application 135 to permit the client application 135 to provide functionality that would ordinarily require access to the server 110 and/or the datastore 115 when the client device 130 is offline. The client application 135 may be considered offline when the server 110 and/or the datastore 115 are not presently accessible to the client application 135 and/or client device 130. For example, the client application 135 may be considered offline when the network 120 is down or there is otherwise no active network connection via the network 120 between the client application 135 and the datastore 115. When the client application 135 does not have an offline mode enabled, and the client application 135 is offline, the client application 135 may be unable to provide functionality that requires access to the server 110 and/or the datastore 115. When the client application 135 determines that offline mode is not enabled, operation 1108 may be performed. When the client application 135 determines that offline mode is enabled, operation 1110 may be performed.

In an operation 1108, the client application 135 may transmit a remote request to the server 110 to delete a data object from the datastore 115 as specified in the user interaction operation 1102. The remote request may be transmitted as a URI, e.g., a URL, from the client device 130 to the server 110. The URI may include an HTTP request, e.g., a REST request. In an embodiment, when the client application 135 and/or the client device 130 are offline, the remote request may not be transmitted, and an error message to the user may be provided instead. In an embodiment, when the client application 135 and/or the client device 130 are offline, the user may also be requested to enable the offline mode so that the delete operation may be queued in the PTQ 1000.

In an operation 1110, the client application 135 may create a delete request to delete a data object as specified in the user interaction operation 1102. The delete request may be created as a URI, e.g., a URL. After the delete request is created, the client application 135 may proceed to add the delete request to the PTQ in an operation 1112.

In operation 1112, the request created in the prior operation may be added to the PTQ 1000 in a pending transaction 1010. The pending transaction 1010 may specify the transaction type as according to the type of the request. The pending transaction 1010 may include a timestamp indicating a time at which the client application 135 received the request. The pending transaction may include a local identifier, e.g., object ID, for reference by the client application 135, for the applicable data object referenced by the request. The pending transaction 1010 may include a sequence number indicating the sequence of the pending transaction 1010 relative to the other pending transactions in the PTQ 1000.

In an operation 1114, the client application 135 may determine whether the client application 135 and/or the client device 130 is offline. For example, the client application 135 may determine whether the client application 135 and/or the client device 130 are presently able to access the server 110 and/or the datastore 115, e.g., via the network 120. When the client application 135 determines that the client application 135 and/or the client device 130 are offline, the process represented by operations 1100 may end.

In an operation 1116, when the client application 135 determines that the client application 135 and/or the client device 130 are not offline, the client application 135 may have access to data stored at the datastore 115. The client application 135 may proceed to process the PTQ 1000 as illustrated in FIG. 11B, beginning with operation 1130, and continue processing the PTQ 1000 until the PTQ 1000 no longer contains any pending transactions 1010. Each pending transaction 1010 may be processed individually and in order according to the chronological timestamp of the pending transactions 1010 or according to the sequence number of the pending transactions 1010. Any remote requests performed while processing the PTQ 1000 may either be performed in the foreground or in the background, depending upon a user preference setting, a number of pending transactions 1010 in the PTQ 1000, and/or an amount of time anticipated for the remote request to take. For example, remote requests may be processed in the background when they would take longer than a threshold amount of time to complete in order to improve responsiveness of the client application 135. A REST request may be more time intensive than some other types of network communications. Therefore, when requests from the client application 135 to the server 110 are REST requests, the client application 135 may synchronize the PTQ 1000 with the datastore 115 in the background in order to minimize latency and improve responsiveness of the client application 135.

In an operation 1118, when it is determined that the user interaction of operation 1102 includes a request to create a data object, the client application 135 may determine whether an offline mode is enabled. A user may enable the offline mode of the client application 135 to permit the client application 135 to provide functionality that would ordinarily require access to the server 110 and/or the datastore 115 when the client device 130 is offline. The client application 135 may be considered offline when the server 110 and/or the datastore 115 are not presently accessible to the client application 135 and/or client device 130. For example, the client application 135 may be considered offline when the network 120 is down or there is otherwise no active network connection via the network 120 between the client application 135 and the datastore 115. When the client application 135 does not have an offline mode enabled, and the client application 135 is offline, the client application 135 may be unable to provide functionality that requires access to the server 110 and/or the datastore 115. When the client application 135 determines that offline mode is not enabled, operation 1120 may be performed. When the client application 135 determines that offline mode is enabled, operation 1122 may be performed.

In an operation 1120, the client application 135 may transmit a remote request to the server 110 to create a data object in the datastore 115 as specified in the user interaction operation 1102. The remote request may be transmitted as a URI, e.g., a URL, from the client device 130 to the server 110. The URI may include an HTTP request, e.g., a REST request. In an embodiment, when the client application 135 and/or the client device 130 are offline, the remote request may not be transmitted, and an error message to the user may be provided instead. In an embodiment, when the client application 135 and/or the client device 130 are offline, the user may also be requested to enable the offline mode so that the create operation may be queued in the PTQ 1000.

In an operation 1122, the client application 135 may create a create request to create a data object as specified in the user interaction operation 1102. The create request may be created as a URI, e.g., a URL. After the create request is created, the client application 135 may proceed to add the create request to the PTQ in operation 1112.

In an operation 1124, when it is determined that the user interaction of operation 1102 includes a request to update a data object, the client application 135 may determine whether an offline mode is enabled. A user may enable the offline mode of the client application 135 to permit the client application 135 to provide functionality that would ordinarily require access to the server 110 and/or the datastore 115 when the client device 130 is offline. The client application 135 may be considered offline when the server 110 and/or the datastore 115 are not presently accessible to the client application 135 and/or client device 130. For example, the client application 135 may be considered offline when the network 120 is down or there is otherwise no active network connection via the network 120 between the client application 135 and the datastore 115. When the client application 135 does not have an offline mode enabled, and the client application 135 is offline, the client application 135 may be unable to provide functionality that requires access to the server 110 and/or the datastore 115. When the client application 135 determines that offline mode is not enabled, operation 1126 may be performed. When the client application 135 determines that offline mode is enabled, operation 1128 may be performed.

In an operation 1126, the client application 135 may transmit a remote request to the server 110 to update a data object in the datastore 115 as specified in the user interaction operation 1102. The remote request may be transmitted as a URI, e.g., a URL, from the client device 130 to the server 110. The URI may include an HTTP request, e.g., a REST request. In an embodiment, when the client application 135 and/or the client device 130 are offline, the remote request may not be transmitted, and an error message to the user may be provided instead. In an embodiment, when the client application 135 and/or the client device 130 are offline, the user may also be requested to enable the offline mode so that the update operation may be queued in the PTQ 1000.

In an operation 1128, the client application 135 may create an update request to update a data object as specified in the user interaction operation 1102. The update request may be created as a URI, e.g., a URL. After the update request is created, the client application 135 may proceed to add the update request to the PTQ in operation 1112.

In an operation 1130, the client application 135 may determine whether the client application 135 and/or the client device 130 is offline. For example, the client application 135 may determine whether the client application 135 and/or the client device 130 are presently able to access the server 110 and/or the datastore 115, e.g., via the network 120. When the client application 135 determines that the client application 135 and/or the client device 130 are offline, the processing of the PTQ may end.

When the client application 135 and/or the client device 130 is determined to be online, in an operation 1132, the client application 135 may determine whether a current pending transaction 1010 being processed includes a request to delete, update, or create a data object. When the current pending transaction 1010 being processed includes a request to delete a data object, the client application 135 may proceed to perform operation 1134. When the current pending transaction 1010 being processed includes a request to update or create a data object, the client application 135 may proceed to perform operation 1136.

In operation 1134, the client application 135 may remove all pending transactions 1010 for the data object having the object ID specified in the current pending transaction 1010 from the PTQ 1000. In operation 1146, the client application 135 may determine whether the data object operated on by the current pending transaction 1010 is a local record or not. When the data object, e.g., object 615, is created by a create request that is included in a current pending transaction 1010 in the PTQ 1000, the data object may not have been downloaded from or created on the datastore 115. A data object that has not been downloaded from or created on the datastore 115 may be a local record. Otherwise, the data object may not be a local record. When the data object is determined to be a local record, the client application 135 may proceed to perform operation 1148. When the data object is not determined to be a local record, the client application 135 may proceed to perform operation 1150.

In operation 1148, the client application 135 may remove the data object, e.g. the object 615, operated on by the current pending transaction 1010 from the local instance of the object-agnostic data structure 600. The client application 135 may then proceed to process the PTQ 1000 in operation 1116 with the next pending transaction 1010.

In an operation 1150, the client application 135 may transmit a request to the server 110 to delete the data object operated on by the current pending transaction 1010 in the datastore 115. The client application 135 may also remove the data object, e.g. the object 615, operated on by the current pending transaction 1010 from the local instance of the object-agnostic data structure 600. The client application 135 may then proceed to process the PTQ 1000 in operation 1116 with the next pending transaction 1010.

In an operation 1136, the client application 135 may determine whether the current pending transaction 1010 is the only pending transaction 1010 in the PTQ 1000 that operates on the data object specified by the current pending transaction 1010. The client application 135 may step through all pending transactions 1010 in the PTQ 1000 and compare the specified object ID of each other pending transaction 1010 with the object ID specified by the current pending transaction 1010. When the determination is negative, the client application 135 may proceed to optimize the PTQ 1000 by aggregating the pending transactions 1010 that operate on the same data object as the current pending transaction 1010 beginning with operation 1138. When the determination is affirmative, the client application 135 may proceed to process the current pending transaction 1010 beginning with operation 1152.

In operation 1138, the client application may identify the next pending transaction 1010 in the PTQ 1000 that operates on the same data object as the current pending transaction 1010. In an operation 1140, the client application 135 may determine whether the identified next pending transaction 1010 has a dependency that would prevent the identified next pending transaction 1010 from being combined with the current pending transaction 1010. The identified next pending transaction 1010 may have a dependency when combining the current pending transaction 1010 with the next pending transaction 1010 would change a net effect of the pending transactions 1010 in the PTQ 1000 as a whole, for example. There may be a dependency when another data object besides that data object operated on by the next pending transaction 1010 includes a data value that depends upon the performance of the identified next pending transaction 1010. When the next pending transaction 1010 does have a dependency, the client application 135 may proceed to operation 1142. When the next pending transaction 1010 does not have a dependency, the client application 135 may proceed to operation 1144.

In an example, a first pending transaction 1010 may create an object 615 "A1" while a subsequent second pending transaction 1010 creates an object "B1." A subsequent third pending transaction 1010 may update the object 615 "A1" to be associated with "B1." When the client application 135 attempts to aggregate the first transaction with the third transaction, a dependency between the objects 615 "A1" and "B1" may be identified in the operation 1140, preventing the first and the third pending transactions from being combined together in the operation 1144. Instead, the client application 135 may proceed to the operation 1142.

In operation 1142, when the identified next pending transaction 1010 for the same data object does not have a dependency, the client application 135 may ignore the identified next pending transaction 1010. The client application 135 may also ignore any other pending transactions 1010 in the PTQ 1000 that have not been considered yet. The client application 135 may then proceed to processing the current pending transaction 1010 in operation 1152.

In operation 1144, when the next pending transaction 1010 for the same data object does not have a dependency, the client application 135 may combine the next pending transaction 1010 with the current pending transaction 1010. The client application 135 may determine a net effect of both the current pending transaction 1010 and the next pending transaction 1010 for the same data object. The client application 135 may then modify the current pending transaction 1010 to have the determined net effect and remove the next pending transaction 1010 for the same data object from the PTQ 1000. Combining multiple transactions into a single transaction having the same net effect may improve responsiveness of the client application 135, especially when a time duration required for synchronizing a single pending transaction 1010 with the datastore 115 is relatively large. For example, REST requests may take more time to complete than other operations. Effectively merging multiple REST requests associated with pending transactions applicable to a single object 615 into a single REST request having a same net effect saves on REST request processing time. The client application 135 may then proceed to operation 1136 again working with the modified current pending transaction 1010.

In operation 1152, the client application 135 may determine whether the current pending transaction 1010 is a create type transaction. When the current pending transaction 1010 is a create type transaction, the client application 135 may proceed to operation 1156. When the current pending transaction 1010 is not a create type transaction, the client application 135 may proceed to operation 1154.

In operation 1154, the client application 135 may transmit a remote request to the server 110 to update the data object operated on by the current pending transaction 1010 in the datastore 115 according to the current pending transaction 1010. The remote request may be transmitted as a URI, e.g., a URL, from the client device 130 to the server 110. The URI may include an HTTP request, e.g., a REST request.

In operation 1156, the client application 135 may transmit a remote request to the server 110 to create the data object operated on by the current pending transaction 1010 in the datastore 115 according to the current pending transaction 1010. The remote request may be transmitted as a URI, e.g., a URL, from the client device 130 to the server 110. The URI may include an HTTP request, e.g., a REST request.

In an operation 1158, the client application 135 may receive and evaluate an acknowledgment from the server 110 to determine whether the remote request of the prior operation was successful. The acknowledgment received may specify whether the server 110 successfully performed the remote request. If no acknowledgment is received from the server 110, the client application 135 may determine that the remote request of the prior operation was not successful and consider that the client application 135 is now in an offline mode.

When the remote request of the prior operation is determined to be successful, the client application 135 may proceed to operation 1160. When the remote request of the prior operation is determined to not be successful, the client application 135 may proceed to operation 1164.

In operation 1164, the client application 135 may mark the current pending transaction 1010 in the PTQ 1000 as failed. An error message may also be presented to the user. The error message may identify the pending transaction 1010 whose synchronization failed. The user may also be presented with an option to (a) attempt the synchronization of the pending transaction 1010 again, (b) remove the failed pending transaction 1010 from the PTQ 1000, updating the failed pending transaction 1010, or (c) take no action.

In operation 1160, the client application 135 may remove the current pending transaction 1010 from the PTQ 1000. Because the current pending transaction has been determined to be successful by the client application 135 in operation 1158, the current pending transaction 1010 has been completed and is no longer pending.

In operation 1162, the client application 135 may update the local object cache, e.g., the local instance of the object-agnostic data structure 600, according to the current pending transaction 1010. This may include updating or creating the local data object, e.g., object 615, that the current pending transaction 1010 is to operate on according to the data included in or specified by the current pending transaction 1010.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between the overlay nodes as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
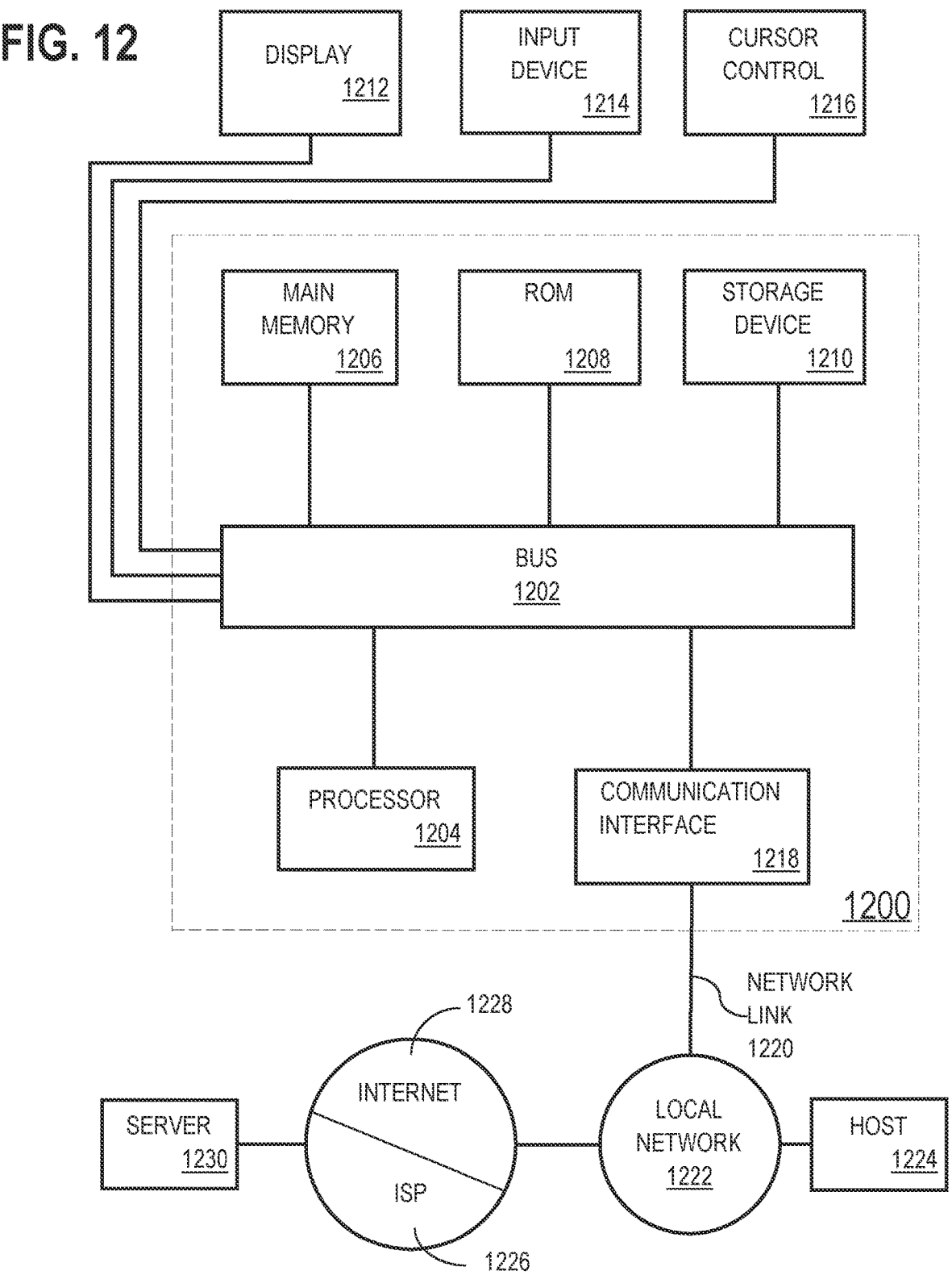
FIG. 12 shows a block diagram that illustrates a computer system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into the remote computer's dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as the code is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   defining an object-agnostic data structure at runtime according to metadata;
   storing an object, obtained from a datastore, as a local version of the object in the object-agnostic data structure;
   receiving a transaction for applying to the object;
   storing the transaction in a pending transaction queue comprising transactions to be synchronized with the datastore, wherein the transaction is not applied to the local version of the object in the object-agnostic data structure;
   receiving a request for a current version of the object;
   responsive to receiving the request for the current version of the object:
      generating a copy of the local version of the object obtained from the datastore and stored in the object-agnostic data structure;
      applying the transaction to the copy of the local version of the object to obtain the current version of the object without applying the transaction to the local version of the object stored in the object-agnostic data structure; and
      presenting the current version of the object.

2. The medium of claim 1, wherein applying the transaction to the copy of the local version of the object is further in response to determining that the current version of the object is not accessible from the datastore.

3. The medium of claim 1, wherein:
   the pending transaction queue is stored on a client device;
   the datastore is stored a server; and
   the client device and the server are intermittently communicatively coupled via a network;
   wherein the storing the transaction in the pending transaction queue is performed responsive to the client device and the server not being communicatively coupled via the network.

4. The medium of claim 1, wherein:
   the pending transaction queue is stored on a client device;
   the datastore is stored a server; and
   the client device and the server are intermittently communicatively coupled via a network;
   wherein the operations further comprise, responsive to determining that the client device is communicatively coupled to the server, synchronizing the pending transaction queue with the datastore by submitting pending transactions from the pending transaction queue to the server.

5. The medium of claim 4, wherein synchronizing the pending transaction queue with the datastore comprises, prior to submitting the pending transactions from the pending transaction queue to the server, combining two or more pending transactions in the pending transaction queue for the object into a single pending transaction for the object having a same net effect.

6. The medium of claim 4, wherein synchronizing the pending transaction queue with the datastore comprises:
forming a uniform resource identifier (URI) that identifies the datastore and includes a pending transaction from the pending transaction queue; and
transmitting the URI to the server.

7. The medium of claim 6, wherein the server provides a representational state transfer (REST) service, and the URI is included in a REST request transmitted to the server.

8. The medium of claim 1, wherein applying the transaction to the copy of the local version of the object comprises:
responsive to determining that there are multiple pending transactions for the object in the pending transaction queue:
combining two or more pending transactions in the pending transaction queue for the object into a single pending transaction for the object having a same net effect.

9. The medium of claim 8, wherein combining two or more pending transactions in the pending transaction queue for the object is further responsive to determining that there are no dependencies in the two or more pending transactions being combined.

10. The medium of claim 1, wherein the operations further comprise defining an object-agnostic data structure at runtime according to metadata for storing the object, wherein the transaction for applying to the object references the object stored in the object-agnostic data structure.

11. A method, comprising:
defining an object-agnostic data structure at runtime according to metadata;
storing an object, obtained from a datastore, as a local version of the object in the object-agnostic data structure;
receiving a transaction for applying to the object;
storing the transaction in a pending transaction queue comprising transactions to be synchronized with the datastore, wherein the transaction is not applied to the local version of the object in the object-agnostic data structure;
receiving a request for a current version of the object;
responsive to receiving the request for the current version of the object:
generating a copy of the local version of the object obtained from the datastore and stored in the object-agnostic data structure;
applying the transaction to the copy of the local version of the object to obtain the current version of the object without applying the transaction to the local version of the object stored in the object-agnostic data structure; and
presenting the current version of the object.

12. The method of claim 11, wherein applying the transaction to the copy of the local version of the object is further in response to determining that the current version of the object is not accessible from the datastore.

13. The method of claim 11, wherein:
the pending transaction queue is stored on a client device;
the datastore is stored a server; and
the client device and the server are intermittently communicatively coupled via a network;
wherein the storing the transaction in the pending transaction queue is performed responsive to the client device and the server not being communicatively coupled via the network.

14. The method of claim 11, wherein:
the pending transaction queue is stored on a client device;
the datastore is stored a server; and
the client device and the server are intermittently communicatively coupled via a network;
wherein the method further comprises, responsive to determining that the client device is communicatively coupled to the server, synchronizing the pending transaction queue with the datastore by submitting pending transactions from the pending transaction queue to the server.

15. The method of claim 14, wherein synchronizing the pending transaction queue with the datastore comprises, prior to submitting the pending transactions from the pending transaction queue to the server, combining two or more pending transactions in the pending transaction queue for the object into a single pending transaction for the object having a same net effect.

16. The method of claim 14, wherein synchronizing the pending transaction queue with the datastore comprises:
forming a uniform resource identifier (URI) that identifies the datastore and includes a pending transaction from the pending transaction queue; and
transmitting the URI to the server.

17. The method of claim 16, wherein the server provides a representational state transfer (REST) service, and the URI is included in a REST request transmitted to the server.

18. The method of claim 11, wherein applying the transaction to the copy of the local version of the object comprises:
responsive to determining that there are multiple pending transactions for the object in the pending transaction queue:
combining two or more pending transactions in the pending transaction queue for the object into a single pending transaction for the object having a same net effect.

19. The method of claim 18, wherein combining two or more pending transactions in the pending transaction queue for the object is further responsive to determining that there are no dependencies in the two or more pending transactions being combined.

20. The method of claim 11, further comprising:
defining an object-agnostic data structure at runtime according to metadata for storing the object, wherein the transaction for applying to the object references the object stored in the object-agnostic data structure.

21. A system, comprising:
one or more processors; and
memory storing instructions that, when executed by the one or more processors, cause the system to perform operations comprising:
defining an object-agnostic data structure at runtime according to metadata;
storing an object, obtained from a datastore, as a local version of the object in the object-agnostic data structure;
receiving a transaction for applying to the object;
storing the transaction in a pending transaction queue comprising transactions to be synchronized with the datastore, wherein the transaction is not applied to the local version of the object in the object-agnostic data structure;
receiving a request for a current version of the object;
responsive to receiving the request for the current version of the object:
 generating a copy of the local version of the object obtained from the datastore and stored in the object-agnostic data structure;
 applying the transaction to the copy of the local version of the object to obtain the current version of the object without applying the transaction to the local version of the object stored in the object-agnostic data structure; and
 presenting the current version of the object.

* * * * *

UNITED STATES PATENT AND TRADEMARK OFFICE
CERTIFICATE OF CORRECTION

PATENT NO. : 11,755,580 B2
APPLICATION NO. : 17/582519
DATED : September 12, 2023
INVENTOR(S) : Balasubrahmanian et al.

It is certified that error appears in the above-identified patent and that said Letters Patent is hereby corrected as shown below:

In the Specification

In Column 1, Line 58, delete "embodiments." and insert -- embodiments; --, therefor.

In Column 1, Line 61, delete "embodiments." and insert -- embodiments; --, therefor.

In the Claims

In Column 50, Line 50, in Claim 3, delete "stored a" and insert -- stored on a --, therefor.

In Column 50, Line 59, in Claim 4, delete "stored a" and insert -- stored on a --, therefor.

In Column 51, Line 67, in Claim 13, delete "stored a" and insert -- stored on a --, therefor.

In Column 52, Line 9, in Claim 14, delete "stored a" and insert -- stored on a --, therefor.

Signed and Sealed this
Eighteenth Day of June, 2024

Katherine Kelly Vidal
*Director of the United States Patent and Trademark Office*